United States Patent
Yang

(10) Patent No.: US 12,424,619 B2
(45) Date of Patent: Sep. 23, 2025

(54) ZINC BASED ALLOYS FOR STABLE AND HIGH-PERFORMANCE SEAWATER-BASED AQUEOUS BATTERIES

(71) Applicant: Yang Yang, Orlando, FL (US)

(72) Inventor: Yang Yang, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 18/392,517

(22) Filed: Dec. 21, 2023

(65) Prior Publication Data
US 2024/0170657 A1 May 23, 2024

Related U.S. Application Data

(62) Division of application No. 17/571,976, filed on Jan. 10, 2022, now Pat. No. 11,894,552.
(Continued)

(51) Int. Cl.
*H01M 4/42* (2006.01)
*H01M 4/02* (2006.01)
(Continued)

(52) U.S. Cl.
CPC .......... *H01M 4/42* (2013.01); *H01M 4/045* (2013.01); *H01M 10/36* (2013.01);
(Continued)

(58) Field of Classification Search
CPC ........ H01M 4/045–0469; H01M 4/42; H01M 10/36; H01M 2004/021; H01M 2004/027; H01M 2300/0002
See application file for complete search history.

(56) References Cited

U.S. PATENT DOCUMENTS

| | | | | |
|---|---|---|---|---|
| 3,764,389 A | * | 10/1973 | Hsia et al. | ................ C25C 5/02 419/62 |
| 2003/0027050 A1 | * | 2/2003 | Okamoto | ................ H01M 4/13 429/231.95 |

(Continued)

FOREIGN PATENT DOCUMENTS

| WO | 2006133641 A1 | 12/2006 |
|---|---|---|
| WO | 2014181253 A2 | 11/2014 |

OTHER PUBLICATIONS

Bučko, M., et al. "Initial corrosion protection of Zn—Mn alloys electrodeposited from alkaline solution." Corrosion Science 53.9 (2011): 2861-2871. (Year: 2011).

(Continued)

*Primary Examiner* — Matthew J Merkling
(74) *Attorney, Agent, or Firm* — BOND, SCHOENECK & KING, PLLC; Joseph M. Noto; George R. McGuire

(57) ABSTRACT

An alloy anode for a seawater based aqueous battery and a universal strategy for preparing anodes for use in seawater based aqueous batteries. Zn-M alloys (where M can be manganese or other transition metal) were prepared by co-electrodeposition in the presence of hydrogen bubble formation to produce a porous nanostructured alloy that can serve as an anode for a seawater based aqueous battery. Exemplary Zn—Mn alloy anodes achieved stability over thousands of cycles even under harsh electrochemical conditions, including testing in seawater-based aqueous electrolytes and using a high current density of 80 mA cm$^{-2}$. The anode design strategy allows for the production of durable electrodes for aqueous batteries and other applications.

19 Claims, 36 Drawing Sheets

Related U.S. Application Data

(60) Provisional application No. 63/135,816, filed on Jan. 11, 2021.

(51) Int. Cl.
   *H01M 4/04* (2006.01)
   *H01M 10/36* (2010.01)

(52) U.S. Cl.
   CPC ................ *H01M 2004/021* (2013.01); *H01M 2004/027* (2013.01); *H01M 2300/0002* (2013.01)

(56) References Cited

U.S. PATENT DOCUMENTS

| | | |
|---|---|---|
| 2017/0025677 A1 | 1/2017 | Steingart et al. |
| 2022/0344650 A1 | 10/2022 | Oki et al. |

OTHER PUBLICATIONS

Han, Chao, et al. "Principals and strategies for constructing a highly reversible zinc metal anode in aqueous batteries." Nano Energy 74 (2020): 104880. (Year: 2020).

Liu, Botian, et al. "Novel 3D nanoporous Zn—Cu alloy as long-life anode toward high-voltage double electrolyte aqueous zinc-ion batteries." Small 16.22 (2020): 2001323. (Year: 2020).

Machine translation of WO-2014181253-A2 obtained on Jun. 14, 2023, pp. 1-10.

Machine translation of WO-2006133641-A1 obtained on Oct. 20, 2023, pp. 1-7.

\* cited by examiner

ZINC BASED ALLOYS FOR STABLE AND HIGH-PERFORMANCE SEAWATER-BASED AQUEOUS BATTERIES

CROSS-REFERENCE TO RELATED APPLICATIONS

The present application is a Divisional Application of U.S. Non-Provisional application Ser. No. 17/571,976, filed Jan. 10, 2022, titled "Zinc-based Alloys For Stable And High-performance Seawater-based Aqueous Batteries" which claims priority to U.S. Provisional Application No. 63/135,816, filed Jan. 11, 2021, titled "Stable, High-performance, Dendrite-free, Seawater-based Aqueous Batteries" the entire contents of each of which are hereby incorporated by reference in their entirety.

STATEMENT REGARDING FEDERALLY SPONSORED RESEARCH AND DEVELOPMENT

This invention was made with government support under grant numbers CBET-1949840 and CMMI-1851674 awarded by National Science Foundation. The government has certain rights in this invention.

1. Field of the Invention

Anodes are disclosed containing alloyed materials, using Zn-M alloys as model systems (M=Mn and other transition metals). The Zn—Mn alloy anodes achieved stability over thousands of cycles even under harsh electrochemical conditions, including testing in seawater-based aqueous electrolytes and using a high current density of 80 mA cm$^{-2}$.

2. Description of the Related Art

Metal anode instability, including dendrite growth, metal corrosion, and hetero-ions interference, occurring at the electrolyte/electrode interface of aqueous batteries, are among the most critical issues hindering their widespread use in energy storage.

The strong safety concerns caused by the decomposition of organic electrolytes are challenging non-aqueous lithium-ion battery (LIB) communities, posing formidable barriers to reliable electric vehicles (EVs) and personal electronics. Alternatively, emerging metal-anode-based aqueous batteries are attracting increasing attention due to the high-safety of nonflammable electrolytes and environmental benignity. However, inhomogeneous metal plating and electrochemical instability at the liquid-solid (electrolyte/metal anode) interface severely jeopardize the performance and life span of aqueous batteries. Progress in stabilizing metal anodes is still in early infancy.

On the other hand, from the perspective of electrolyte chemistry, the solvents and salts used in aqueous electrolytes are among the most important components in aqueous batteries that determine their performance. In practice, deionized (DI) water and high-purity water are commonly used solvents in aqueous batteries to achieve well-controlled battery chemistry by eliminating the interference of hetero-ions (e.g. $Ca^{2+}$, $Mg^{2+}$, $Na^+$, $SO_4^-$, $Cl^-$, $NO_3^-$, $F^-$, etc.) on the battery stability. Besides, blended salts have been used in the electrolytes to improve the electrochemical performance of aqueous batteries by tuning the composition of cations and anions in the electrolyte, thereby achieving high ionic conductivity. However, the complexity of the electrolyte components used in those strategies makes them economically less competitive than current rechargeable battery technologies for industrial-level applications. Accordingly, there is a need in the art for a high-performance alloy anode for aqueous batteries that resolves the long-standing instability issues.

BRIEF SUMMARY OF THE INVENTION

The present invention comprises a universal strategy for the design of high-performance alloy anode for aqueous batteries, thus resolving long-standing instability issues and revolutionizing the battery industry. The ultra-stable anode can be used under extremely harsh electrochemical conditions (e.g., using seawater-based electrolyte and high current density), opening a new window for robust and fast charging battery development. The present invention thus provides a step forward towards high-performance, low-cost, reliable rechargeable batteries. The aqueous battery chemistry involved in the present invention can be extended to other fields, including but not limited to other rechargeable batteries, metal anti-corrosion, "seawater economy", "blue energy", and beyond.

In a first embodiment, the present invention may be an anode for aqueous batteries, comprising a porous nanostructure formed by an alloy of zinc and a transition metal. The transition metal may comprise manganese or copper, as an example. The alloy may comprise $Zn_3Mn$. The pores of the porous nanostructure may have diameters between five nanometers and 50 micrometers.

In another embodiment, the present invention may be an aqueous battery formed by an electrochemical cell including an anode having a porous nanostructured alloy of zinc and a transition metal, a cathode, and a seawater-based electrolyte, wherein the electrochemical cell remains dendrite free at a current density of 80 microamps per centimeter squared. The transition metal may comprise manganese or copper, as an example. The alloy may comprise $Zn_3Mn$. The pores of the porous nanostructure may have diameters between five nanometers and 50 micrometers.

In a further embodiment, the present invention may be a method of making an anode for an aqueous battery. The method includes the steps of co-electrodepositing ions of zinc and ions of a transition metal while simultaneously facilitating hydrogen bubble evolution during co-electrodeposition of the ions of zinc and ions of the transition metal to form a porous nanostructured alloy of zinc and the transition metal. The transition metal may comprise manganese or copper, as an example. The alloy may comprise $Zn_3Mn$. The pores of the porous nanostructure may have diameters between five nanometers and 50 micrometers.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a series of graphs showing the preparation and characterizations of a Zn—Mn alloy anode according to the present invention as follows: (a) SEM image. The scale bar: 10 μm. (b) XRD pattern. (c) AFM image. (d) Schematic illustration of Zn plating processes on Zn anode (top) and Zn—Mn anode (bottom).

FIG. 2 is a series of graphs showing the electrochemical performance and Zn plating/stripping behaviors of Zn—Mn alloy in the aqueous electrolytes, as follows: (a) pH values of different electrolytes prepared using DI water and seawater as solvents. (b) Cyclic voltammetry curves of seawater-based electrolytes. Scan rate: 1 mV s$^{-1}$. Working electrode: Pt. Reference and counter electrodes: Zn—Mn alloy. (c) Long-term galvanostatic cycling performance of Cu//Zn and Cu//Zn—Mn cells at a current density of 10 mA cm$^{-2}$. (d) Long-term galvanostatic cycling performance of symmetric Zn—Mn and pristine Zn cells at a current density of 80 mA cm$^{-2}$ (Areal capacity: 16 mAh cm$^{-2}$; Electrolyte: 2 M ZnSO$_4$ in seawater).

FIG. 3 is a series of graphs of the electrochemical performance and characterizations of aqueous Zn batteries. (a) Cycling performance of ZABs (Zn$_3$Mn) and ZABs (Zn). (b) Discharging plateaus of ZABs (Zn$_3$Mn) and ZABs (Zn) at a current density of 30 mA cm$^{-2}$. (c) Discharging and power density plots of ZABs (Zn$_3$Mn) and ZABs (Zn). (d) Typical charge/discharge profiles of ZIBs (Zn$_3$Mn) at 0.5 C (Electrolyte: 2 M ZnSO$_4$ and 0.1 M MnSO$_4$ in seawater). Cycling performance of ZIBs (Zn$_3$Mn) at (e) 1C and (f) 4C, respectively.

FIG. 4 is a schematic of suggested Stranski-Krastanov growth process of 3D Zn—Mn alloy.

FIG. 5 is a series of SEM images of Zn—Mn alloy electrodeposited for (a) 10 min, (b) 20 min, (c) 30 min, and (d) 40 min. Scale bars: 10 μm. The Zn—Mn alloy clusters or islands initially nucleated and then coalesced to form a continuous film. Meanwhile, a large number of pores formed in the 3D alloy due to the evolution of hydrogen bubbles.

FIG. 6 is a series of SEM images of the morphologies of the Zn—Mn alloy, as follows (a) Zn—Mn alloy@Zn and (b) Zn—Mn alloy. Scale bars: 100 μm. Cauliflower-shaped Zn—Mn alloy firmly anchors on the Zn substrate surface. Many hierarchical pores were observed.

FIG. 7 is a series of images of the morphologies of an as-prepared Zn—Mn alloy, as follows: (a) Cross-sectional and (b) top-view SEM images of Zn—Mn alloy prepared by 40 min deposition. Scale bars: 10 μm. A porous structure was formed by the evolved hydrogen bubbles.

Figure 13:
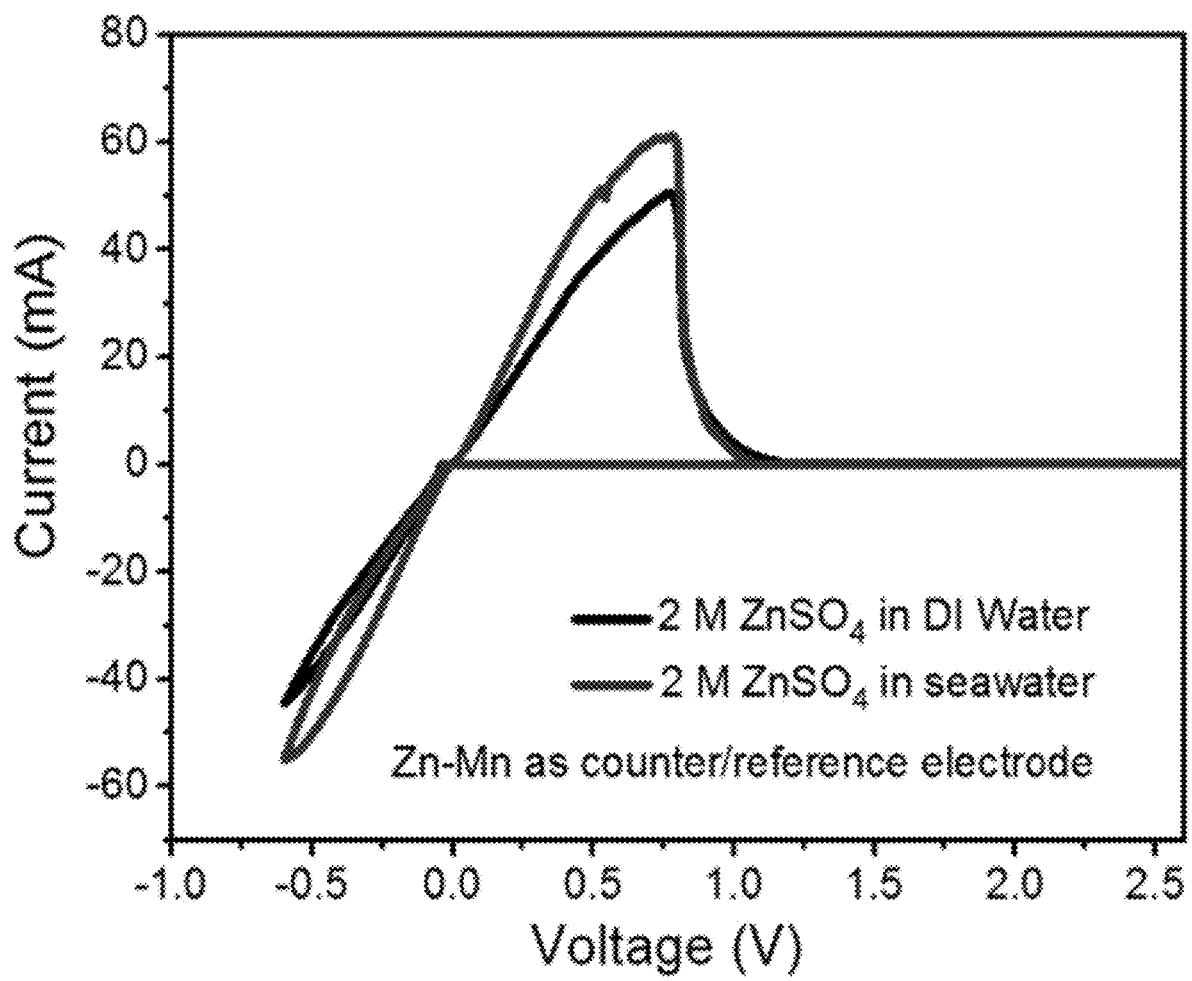

FIG. 13 is a graph of the electrochemical performance of the Zn—Mn alloy in aqueous electrolytes. CV curves of seawater and DI water-based electrolytes. Scan rate: 1 mV s$^{-1}$. Working electrode: Pt. Reference and counter electrodes: Zn—Mn alloy.

Figure 14:
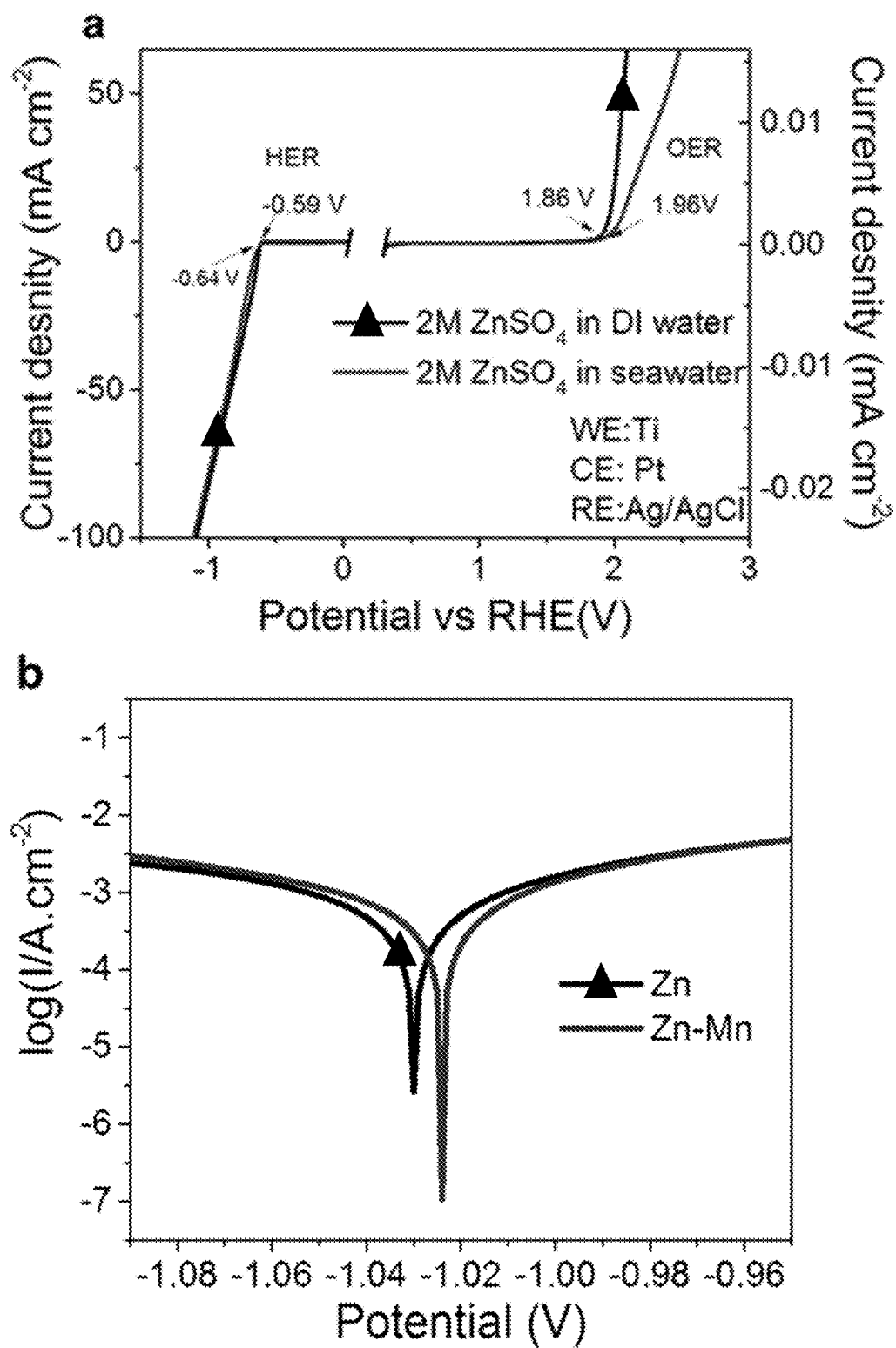

FIG. 14 is a pair of graphs of the characterizations of the electrochemical stability window and anti-corrosion ability, as follows: (a) The linear sweep voltammetry curves of the DI water and seawater based aqueous electrolytes at 5 mV s$^{-1}$, where the potentials were referred to as a reversible hydrogen electrode (RHE). (b) Tafel curves of Zn and Zn—Mn alloy in seawater.

Figure 15:
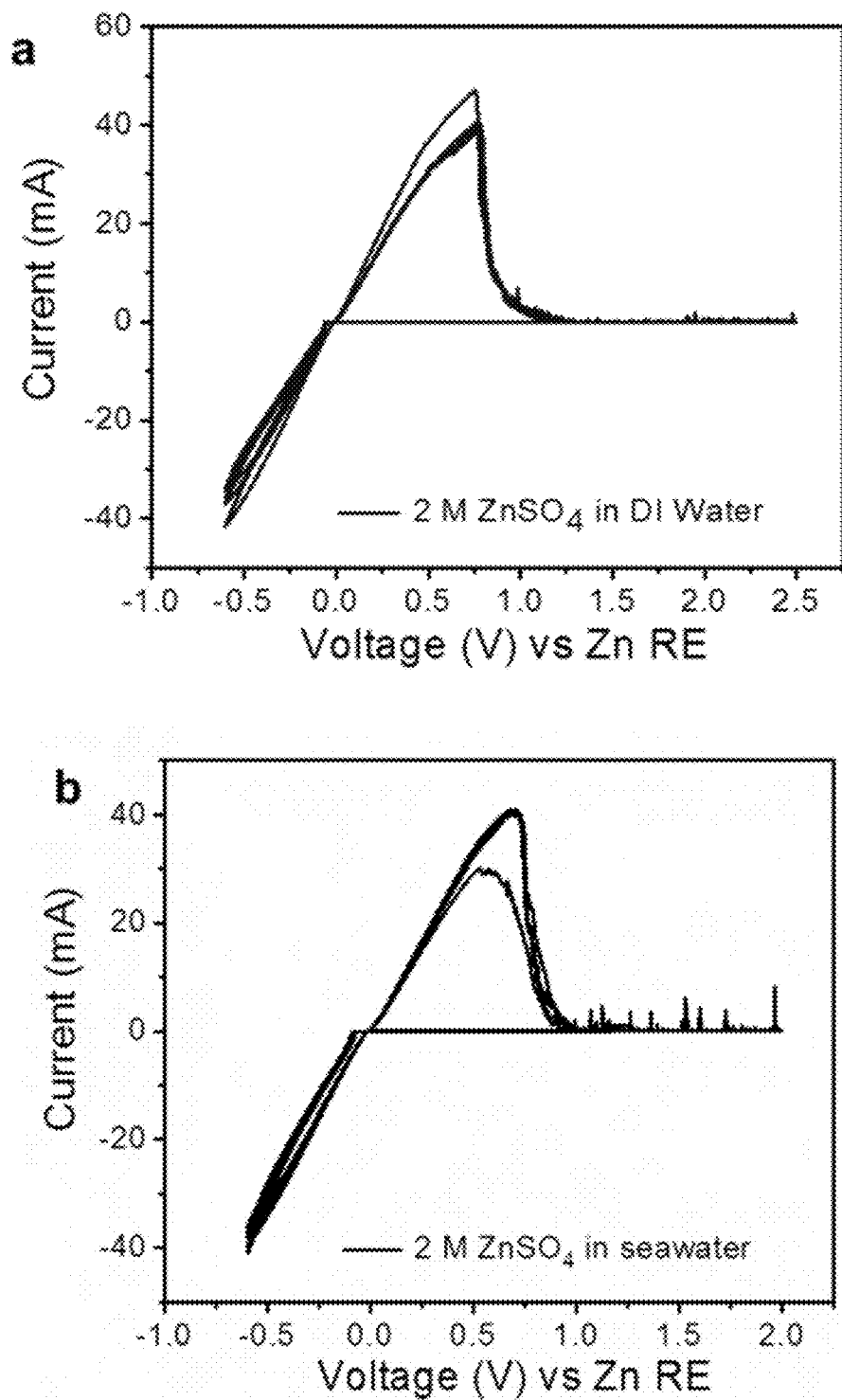

FIG. 15 is a pair of graphs of the electrochemical performance of pristine Zn in aqueous electrolytes. CV test in different electrolytes (Electrolyte A: 2 M ZnSO$_4$ in DI water; Electrolyte B: 2 M ZnSO$_4$ in seawater), illustrating the electrochemical stability under Zn plating/stripping processes. Electrolyte A had a little better stability than Electrolyte B, confirming the corrosion at the interface of seawater/Zn. Working electrode: Pt. Reference and counter electrode: pristine Zn.

Figure 16:
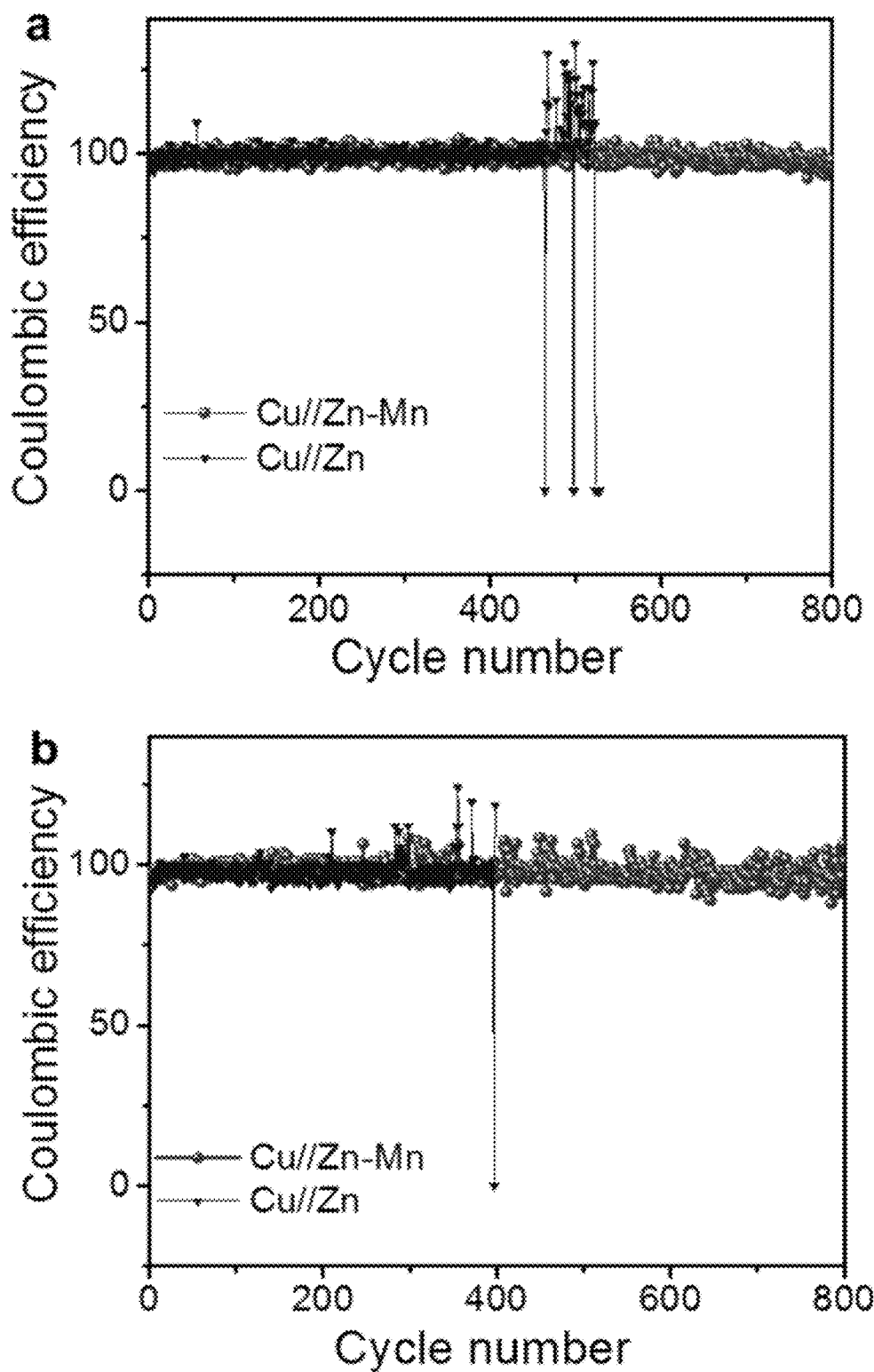

FIG. 16 is a pair of graphs of the electrochemical performance of Cu//Zn and Cu//Zn—Mn coin cells using seawater-based electrolytes. Coulombic efficiencies of the Zn plating/stripping at current densities of (a) 20 mA cm$^{-2}$ and (b) 30 mA cm$^{-2}$. Working electrode: Cu. Counter electrode: Zn foil or Zn—Mn alloy. The electrolyte: 2 M ZnSO$_4$ and 0.1 M MnSO$_4$ in seawater. At high current densities of 20 mA cm$^{-2}$ and 30 mA cm$^{-2}$, the Cu//Zn cells were short-circuited after 450 cycles due to the dendrite growth. The Cu//Zn—Mn cells maintained very stable performance even after 800 cycles, indicating the superior stability in the seawater-based electrolyte.

Figure 17:
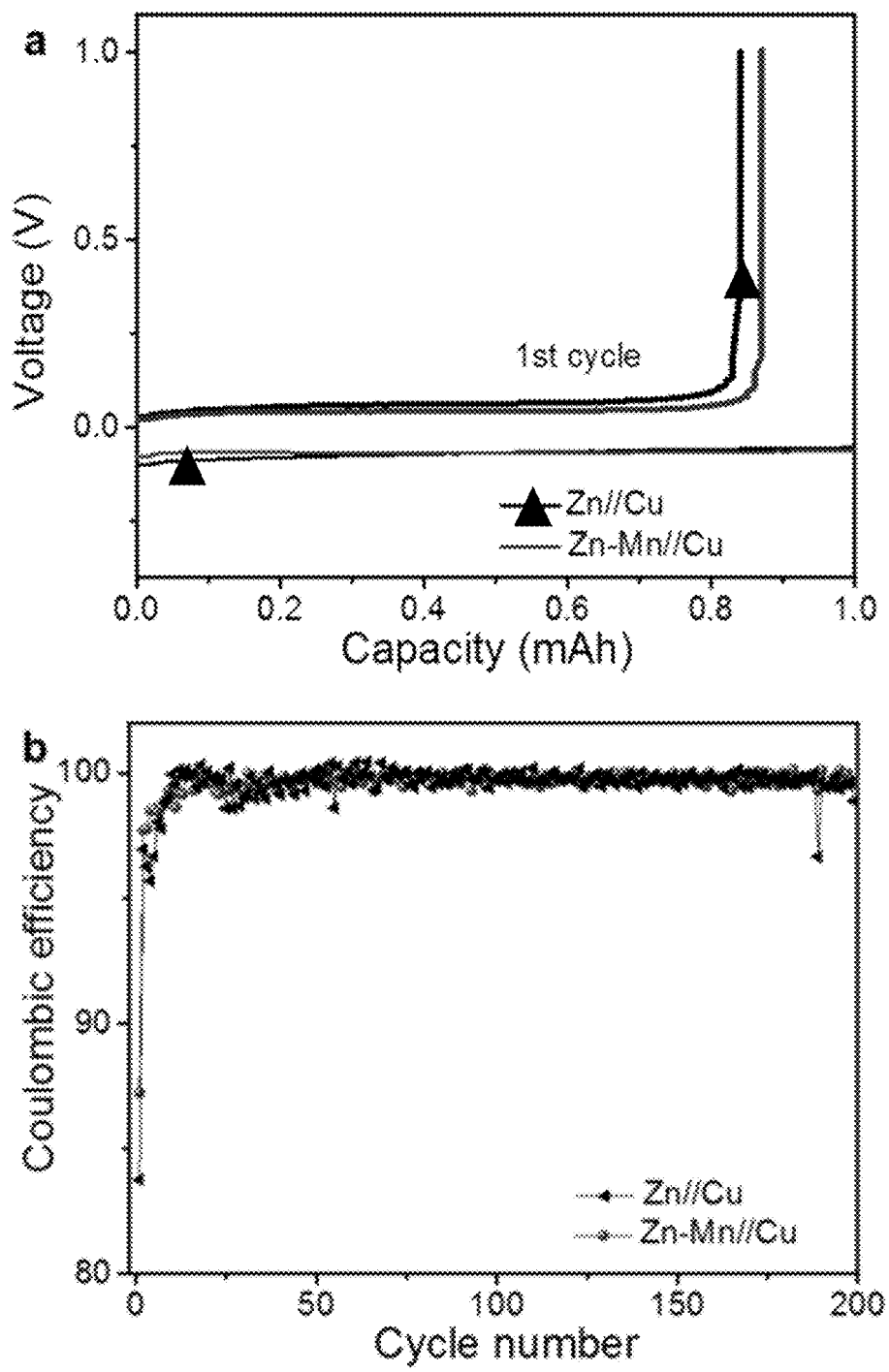

FIG. 17 is a pair of graphs of the electrochemical performance of Cu//Zn and Zn—Mn//Cu coin cells using DI water-based electrolytes. (a) Charge-discharge voltage gap in the 1st cycle and (b) Coulombic efficiency (CE) stability of Zn and Zn—Mn alloy at a current density of 5 mA cm$^{-2}$ (areal capacity: 1.0 mAh cm$^{-2}$) using Cu as cathodes in the electrolyte consisting of 2 M ZnSO$_4$ in water. At a current density of 5 mA cm$^{-2}$, the Zn—Mn//Cu cells present a higher initial CE with a lower polarization of 109 mV (137 mV for Zn//Cu cells) and keep stable cycling performance for over 200 cycles.

Figure 18:
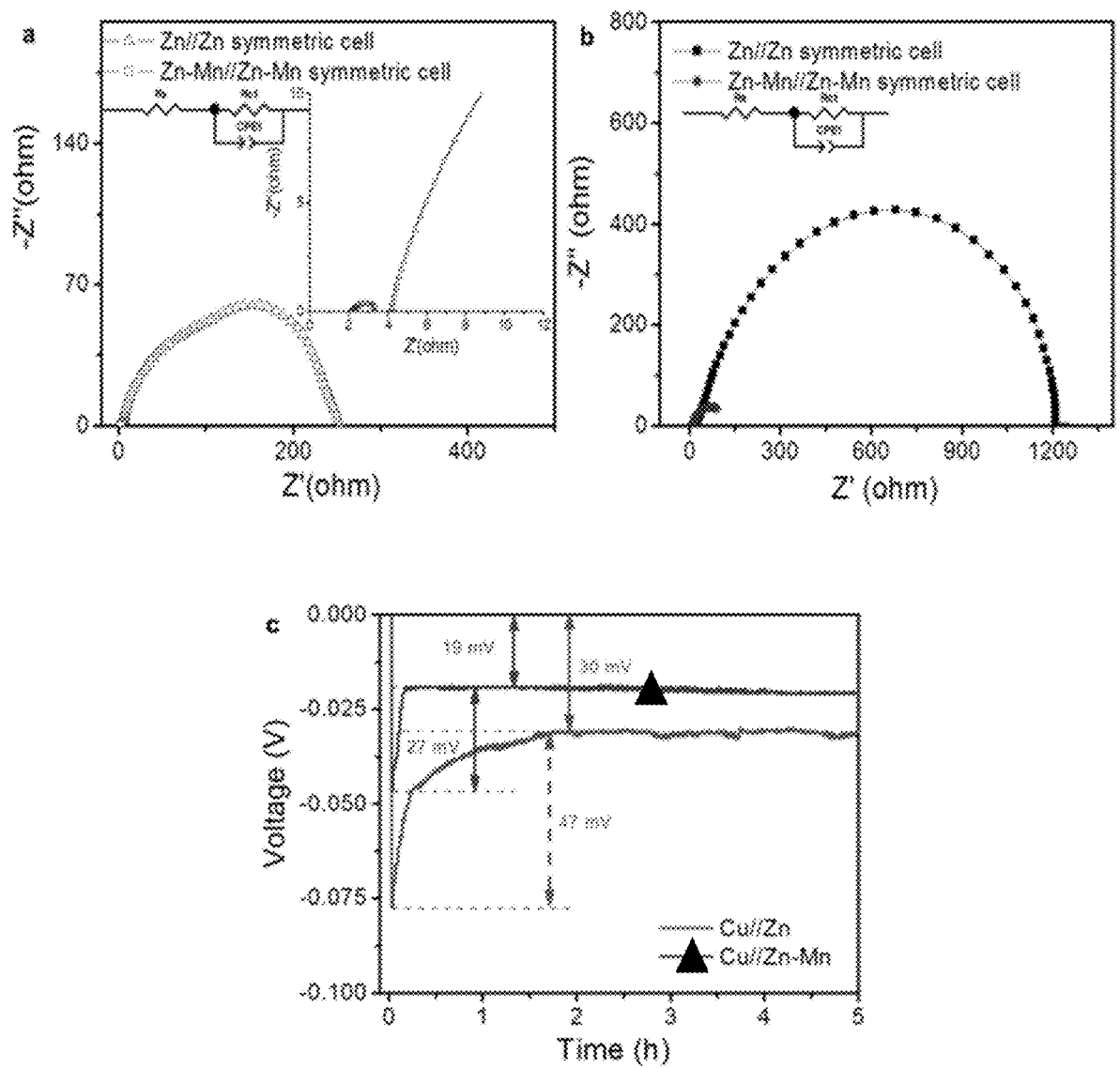

FIG. 18 is a series of graphs of the electrochemical impedance spectroscopy (EIS) of the symmetric Zn//Zn and Zn—Mn//Zn—Mn cells. (a) Seawater-based electrolyte (2 M ZnSO$_4$ in seawater) and (b) DI water-based electrolyte (2 M ZnSO$_4$ in DI water). (c) Nucleation overpotentials of Zn—Mn alloy and pristine Zn asymmetric cells (vs. Cu electrode) at a current density of 1.0 mA cm$^{-2}$.

Figure 19:
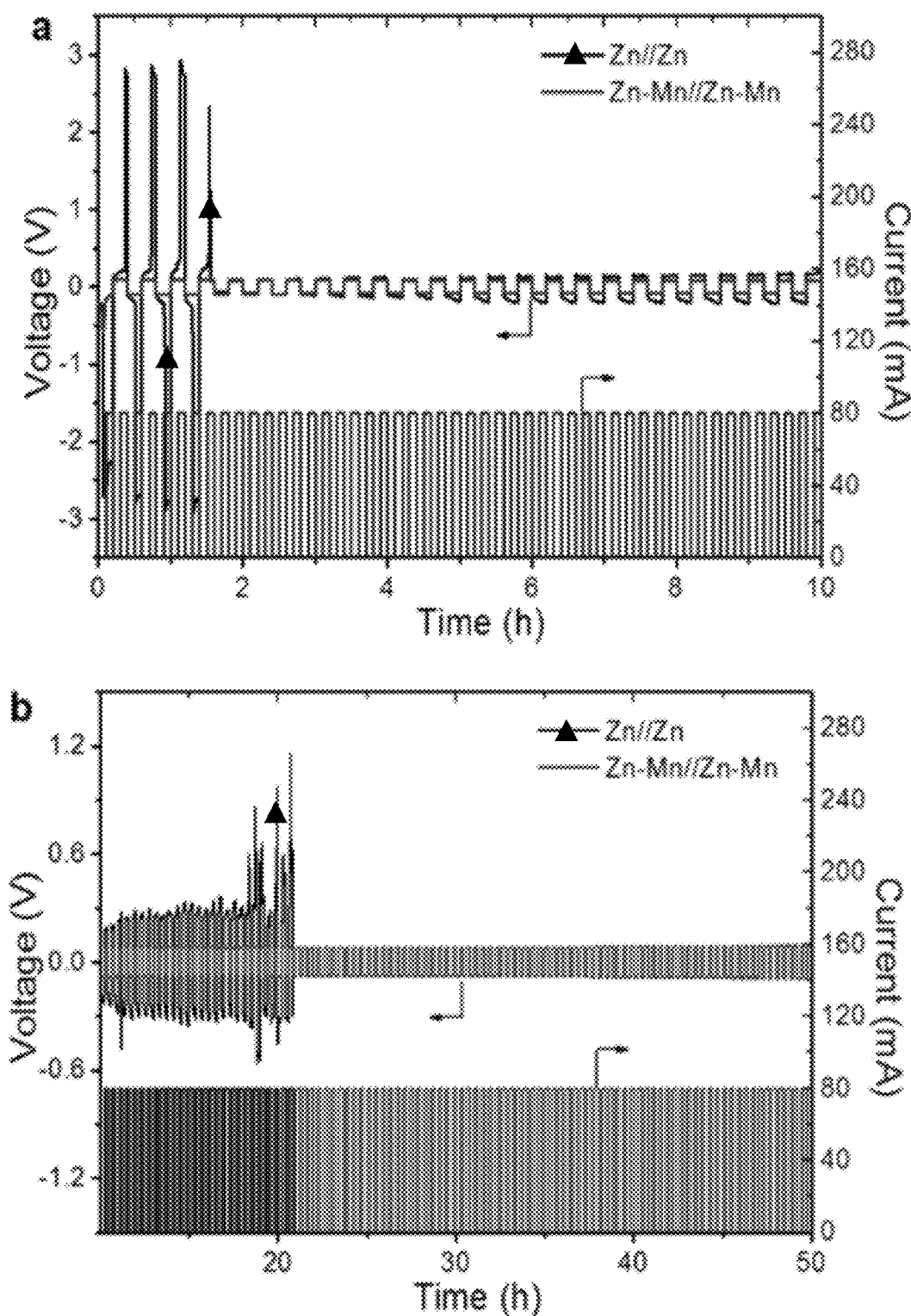

FIG. 19 is a pair of graphs of the plating/stripping curves of the symmetric Zn—Mn//Zn—Mn and Zn//Zn cells. At a current density of 80 mA cm$^{-2}$ (areal capacity: 16 mAh cm$^{-2}$) in the range of (a) 0-10 h and (b) 10-50 h. Electrolyte: 2 M ZnSO$_4$ in seawater.

Figure 20:
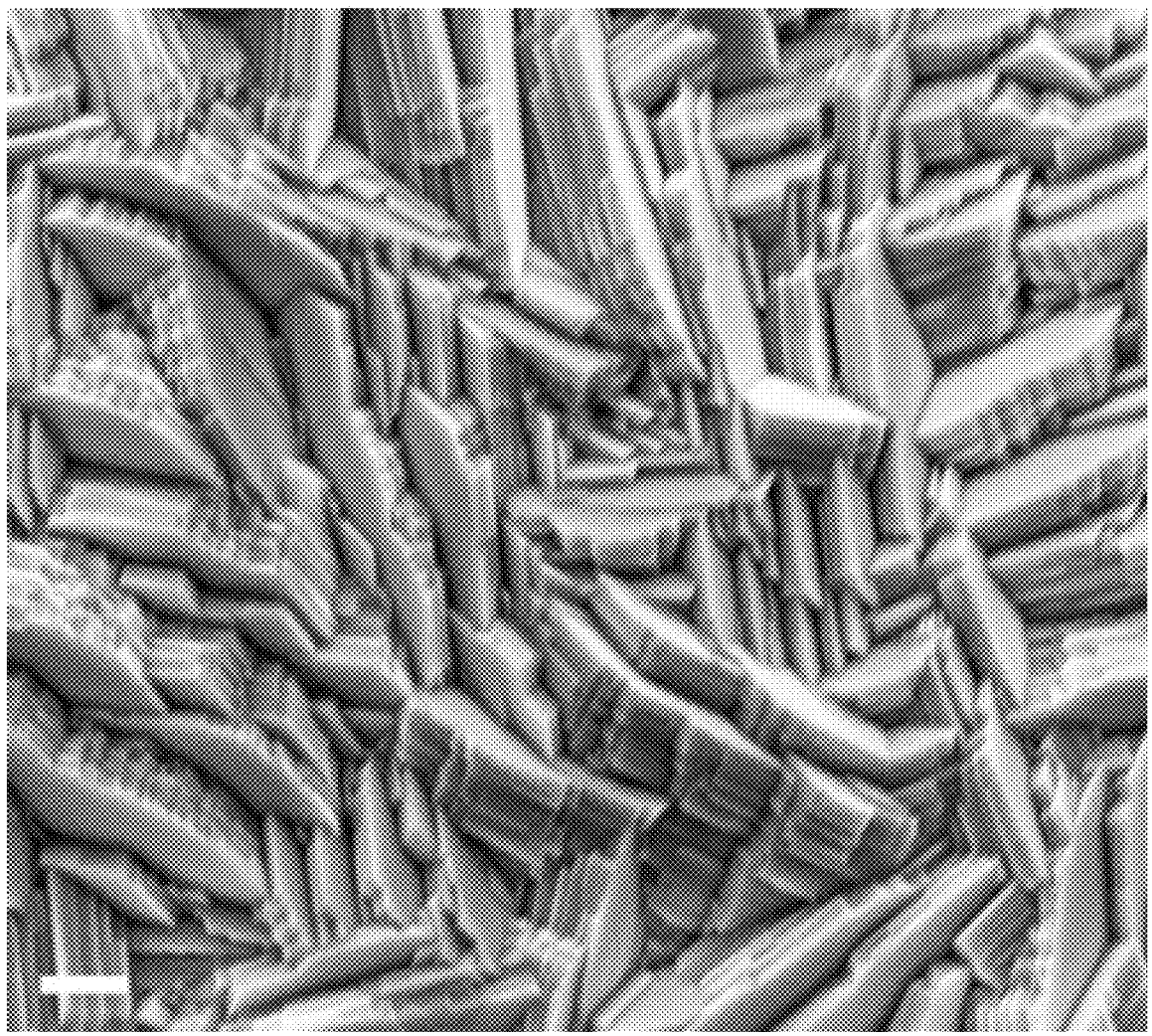

FIG. 20 is an SEM image of the morphology of Zn@Zn anode. Scale bar: 1 μm.

Figure 21:
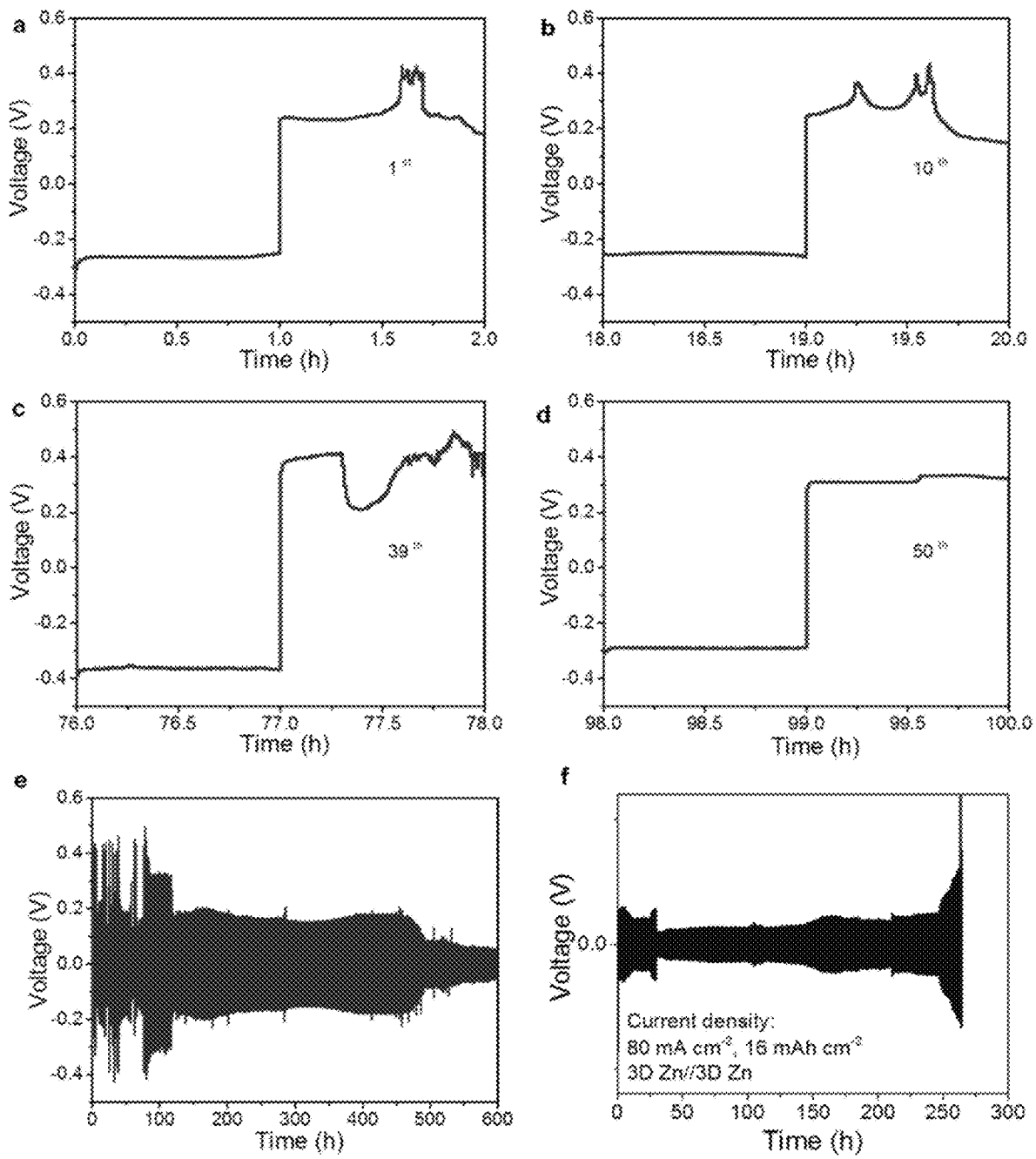

FIG. 21 is a series of graphs of the plating/stripping profiles of symmetric Zn@Zn//Zn@Zn cells, as follows: (a) 1$^{st}$, (b) 10$^{th}$, (c) 39$^{th}$, and (d) 50$^{th}$ cycle at a current density of 5 mA cm$^{-2}$. (e) and (f) Long-term cycling performance at a current density of 5 mA cm$^{-2}$ (areal capacity: 5.0 mAh cm$^{-2}$) and 80 mA cm$^{-2}$ (areal capacity: 16 mAh cm$^{-2}$), respectively. Electrolyte: 2 M ZnSO$_4$ in seawater.

Figure 22:
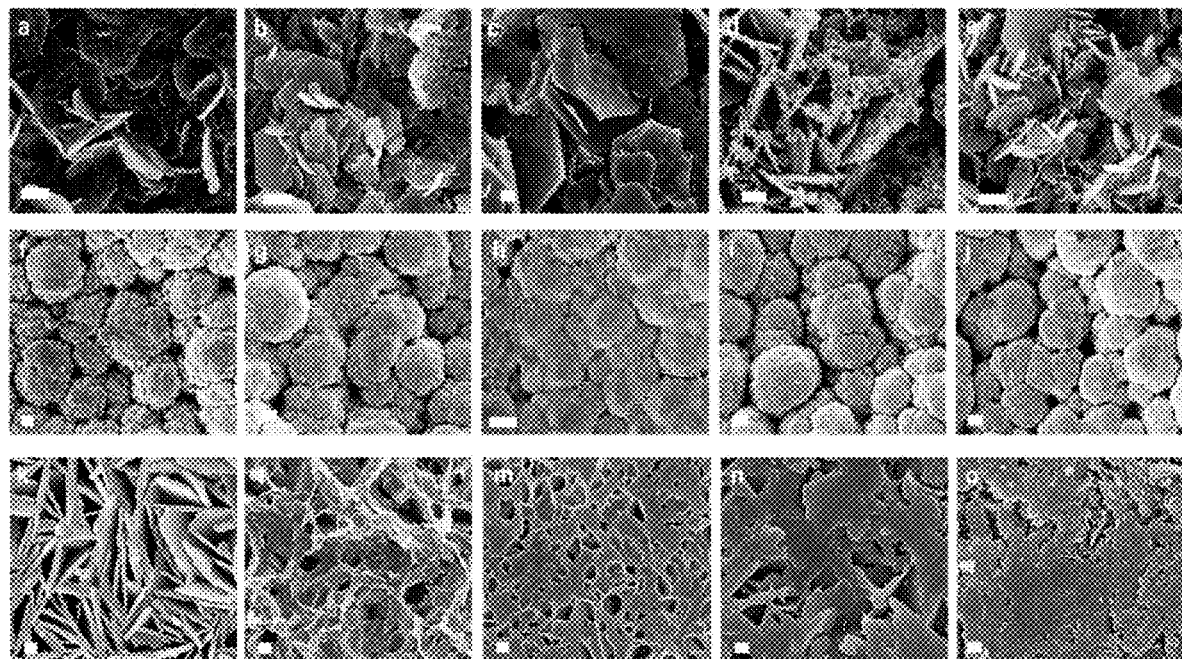

FIG. 22 is a series of SEM images of the morphologies of Zn and Zn—Mn alloy after Zn plating at different current densities of 1, 5, 10, 50, and 80 mA cm$^{-2}$ (from left columns to right columns, areal capacity: 1.0 mAh cm$^{-2}$), as follows: (a-e) SEM images of Zn. Scale bars: 1 μm. (f-j) SEM images of Zn—Mn alloy. Scale bars: 10 μm. (k-o) High-magnification SEM images of Zn—Mn alloy. Scale bars: 200 nm.

Figure 23:
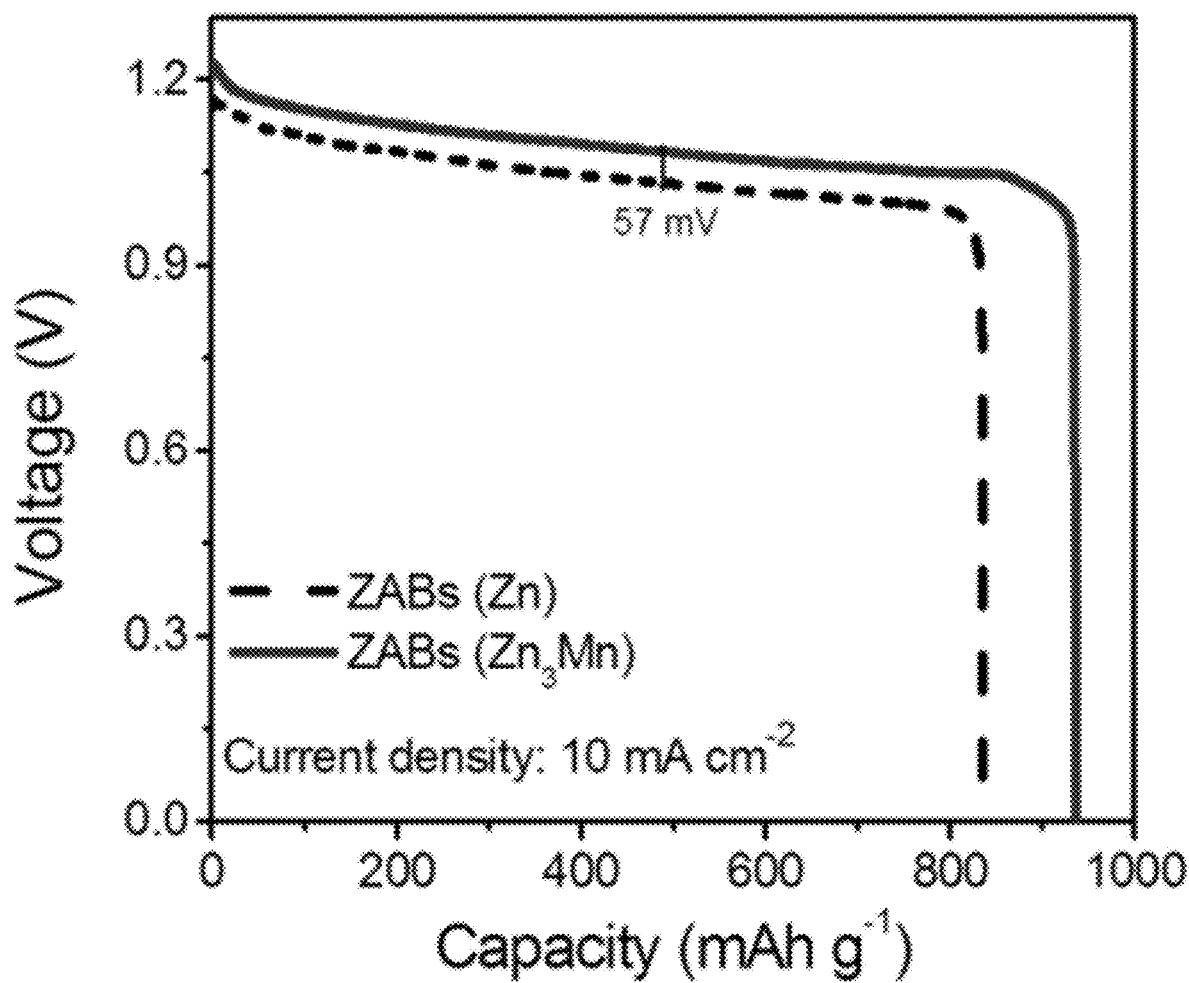

FIG. 23 is a graph of Zn-air batteries (ZABs) using different metal anodes of the long-term discharging profiles of ZAB using Pt/C@$RuO_2$ cathode and Zn—Mn alloy (ZABs ($Zn_3Mn$), red solid line) or Zn anode (ZABs (Zn), black dash line) at 10 mA $cm^{-2}$.

Figure 24:
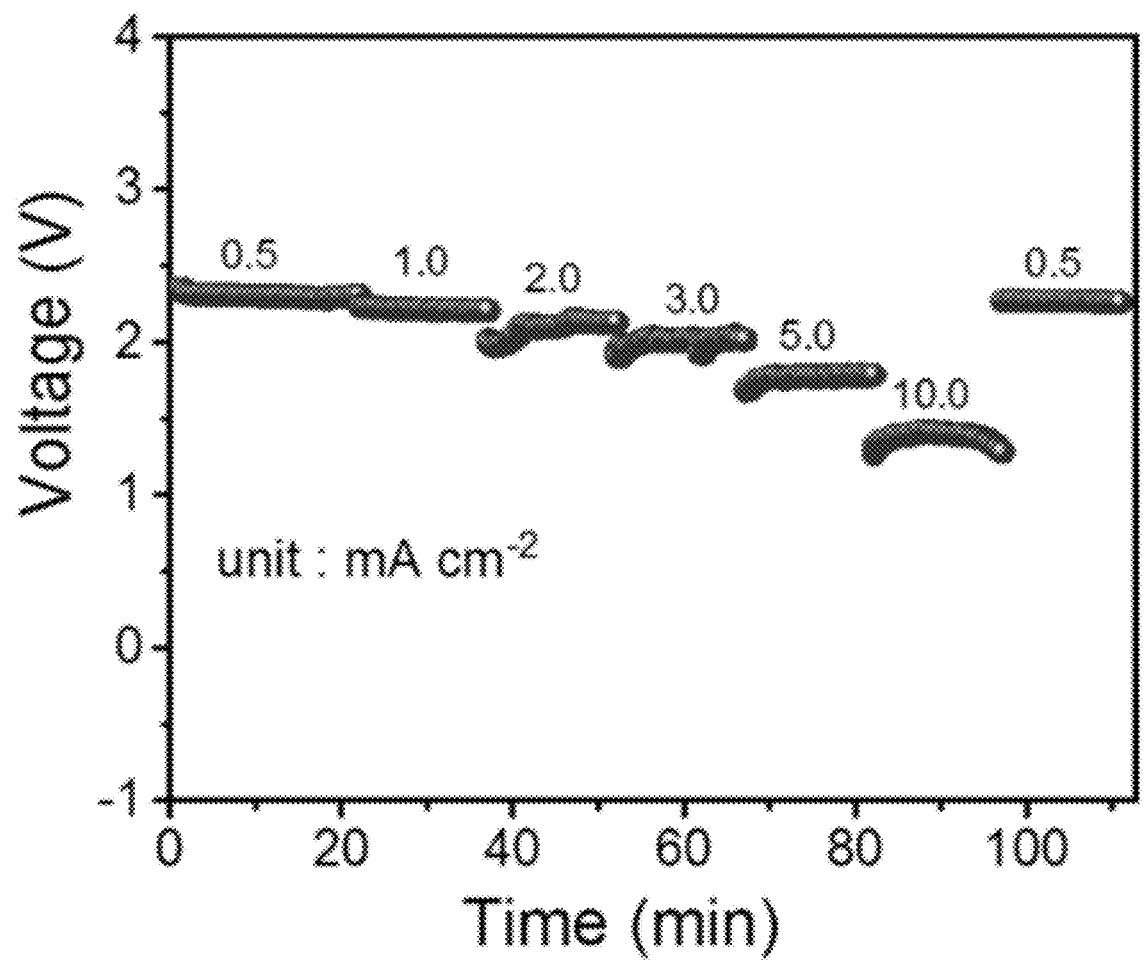

FIG. 24 is a graph of Flexible ZABs and the rate-performance of two flexible tandem ZABs, respectively.

Figure 25:
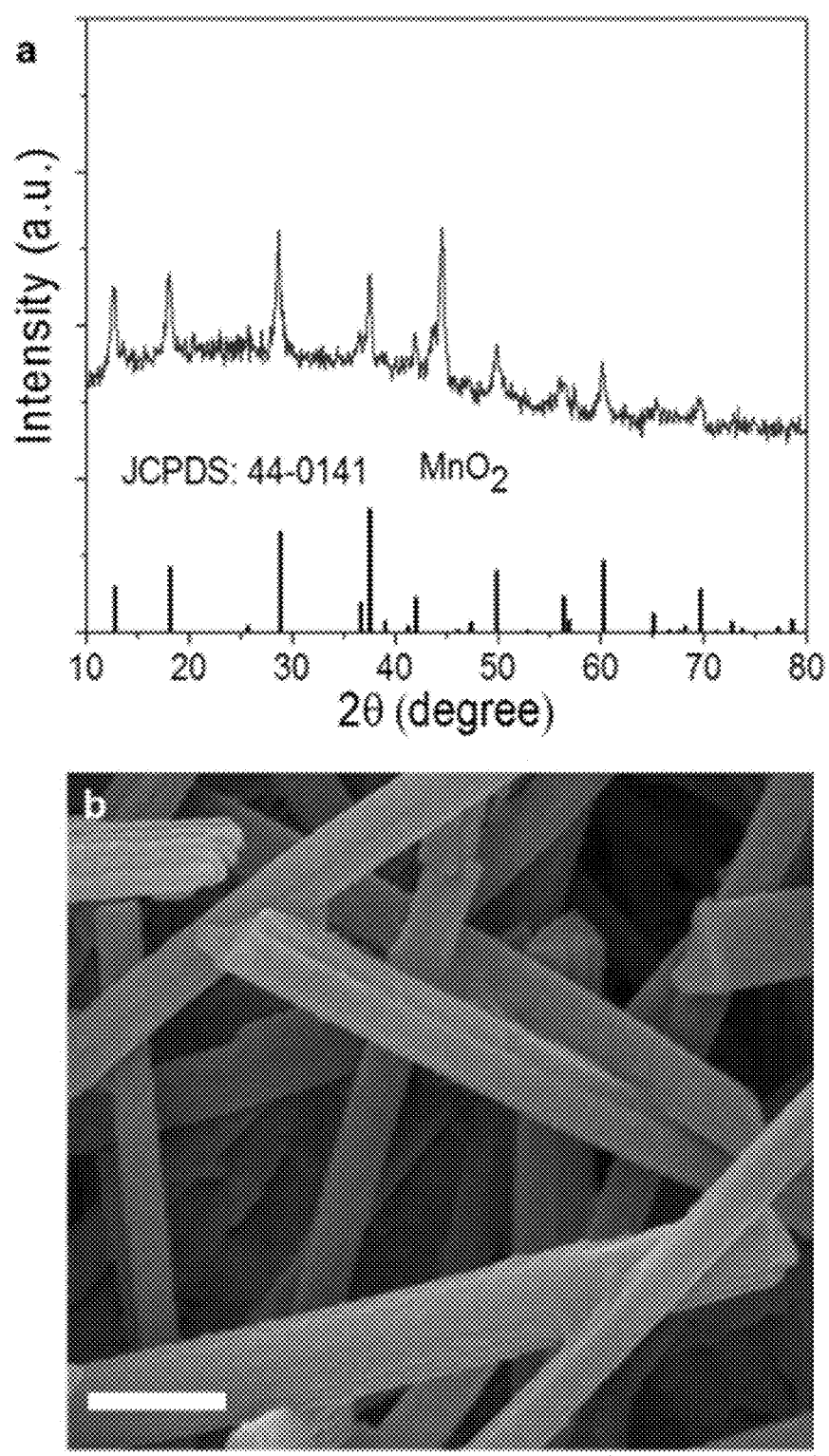

FIG. 25 is a graph and an SEM image of the characterizations of $MnO_2$ cathodes for Zn—Mn//$MnO_2$ batteries. (a, b) XRD pattern and SEM image, respectively. Scale bar: 200 nm.

Figure 26:
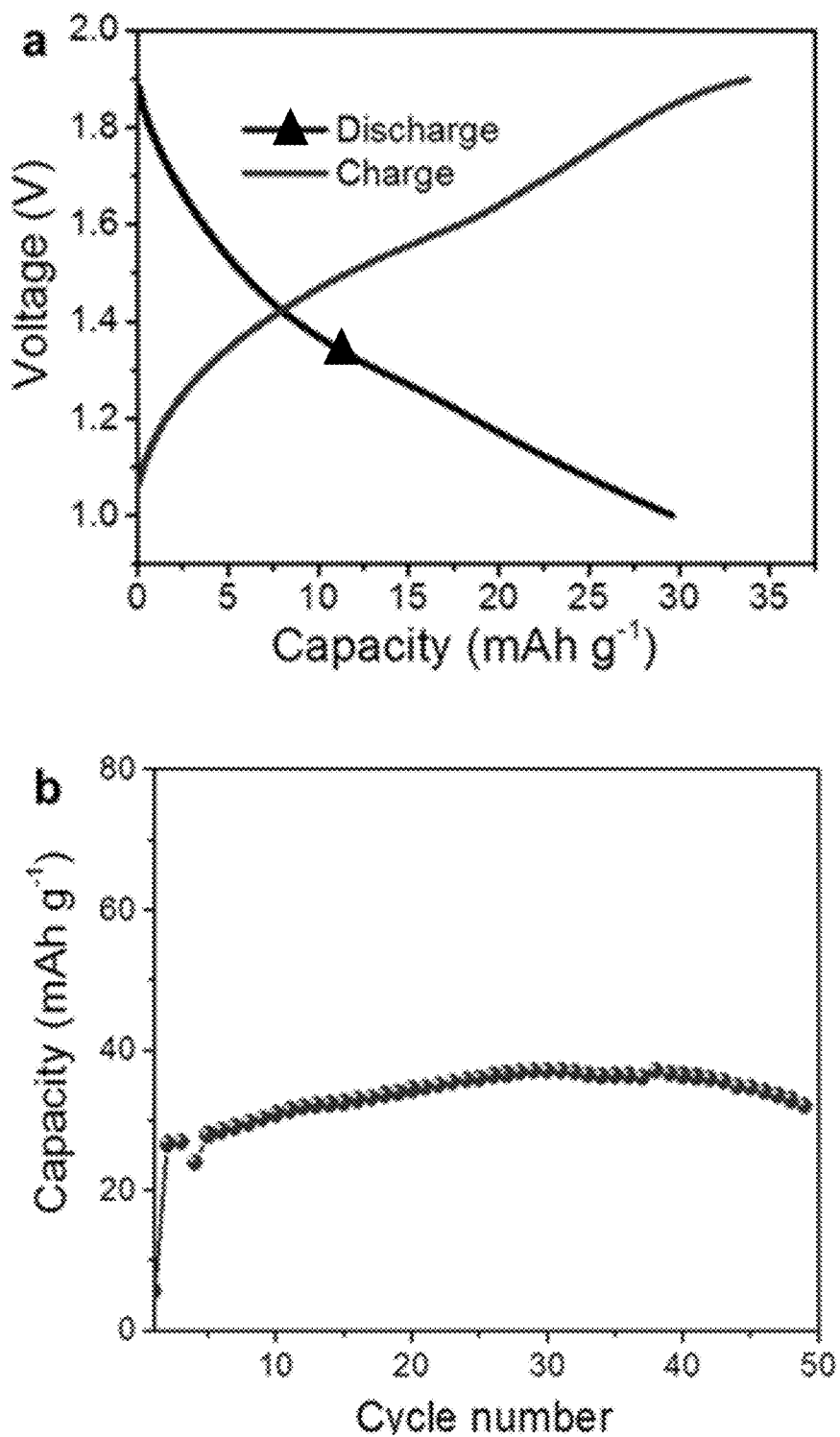

FIG. 26 is a pair of graphs of the electrochemical performance of Zn—Mn//$MnO_2$ batteries in the seawater-based electrolyte (2 M $Na_2SO_4$ in seawater), as follows: (a, b) Charge/discharge profiles and cycling performance, respectively.

Figure 27:
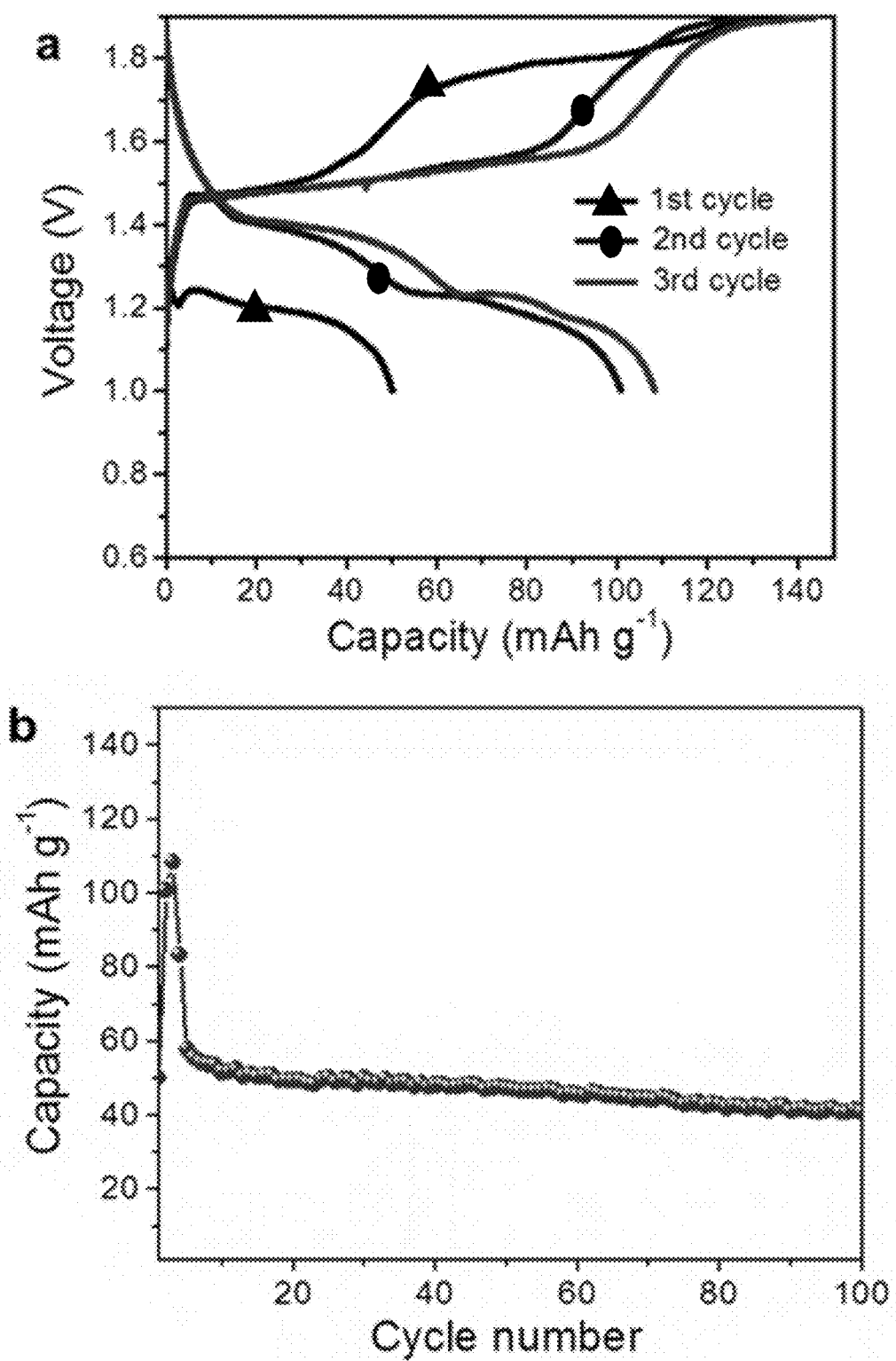

FIG. 27 is a pair of graphs of the electrochemical performance of Zn—Mn//$MnO_2$ batteries using seawater-based electrolyte (2 M $MgSO_4$ in seawater), as follows: (a, b) Charge/discharge profiles and cycling performance, respectively.

Figure 28:
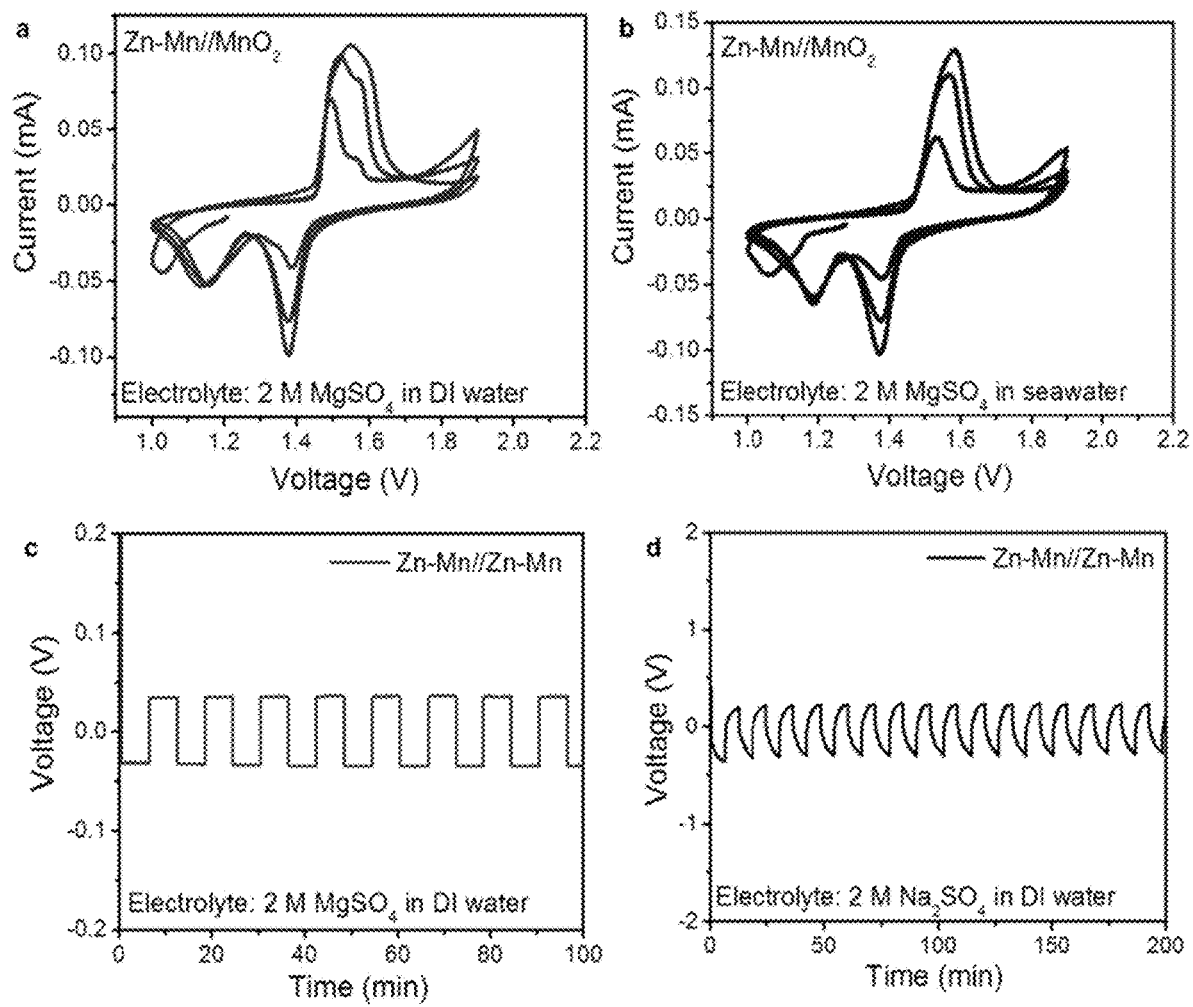

FIG. 28 is a series of graphs of the impact of hetero-ions ($Na^+$ and $Mg^{2+}$) on the electrochemical performance of Zn—Mn alloy. CV curves of Zn—Mn//$MnO_2$ batteries using $Mg^{2+}$-containing electrolytes in (a) DI water and (b) seawater. Cycling performance of the symmetric Zn—Mn//Zn—Mn cells at a current density of 1 mA $cm^{-2}$ using (c) $Mg^{2+}$-containing electrolyte and (d) $Na^+$-containing electrolyte.

Figure 29:
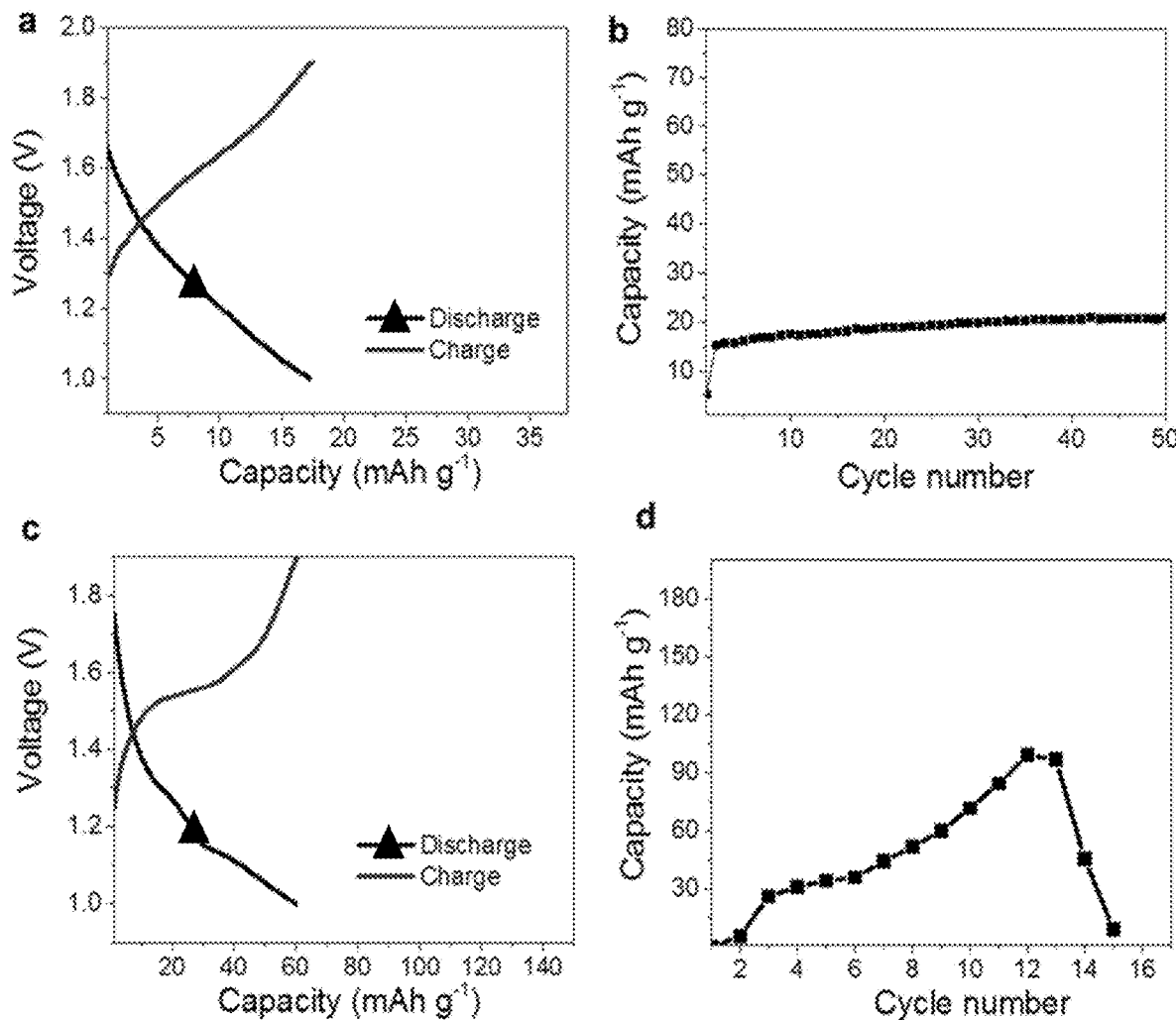

FIG. 29 is a series of graphs of the electrochemical performance of Zn//$MnO_2$ batteries using the seawater-based electrolyte, as follows: (a, b) Charge/discharge profiles and cycling performance, respectively (2 M $Na_2SO_4$ in seawater). (c, d) Charge/discharge profiles and cycling performance, respectively (2 M $MgSO_4$ in seawater).

Figure 30:
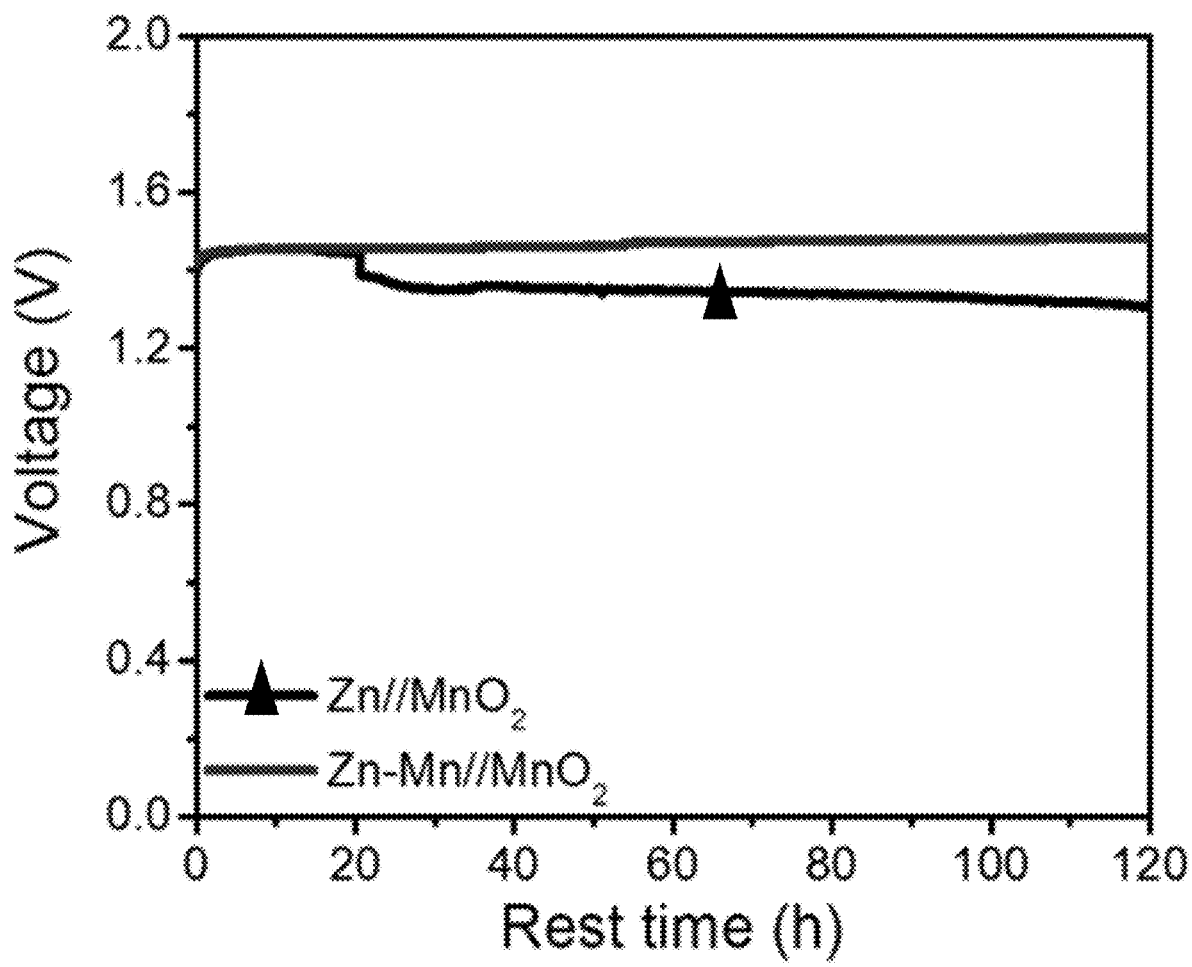

FIG. 30 is a graph of the self-discharge test on Zn-ion batteries (ZIBs) using pristine Zn and Zn—Mn alloy as anodes in the seawater-based electrolyte (2 M $ZnSO_4$ in seawater). The open-circuit voltage (OCV) of ZIBs (Zn) dropped quickly after about 20 h test (black line), indicating the corrosion of the pristine Zn anode. In sharp contrast, the OCV of ZIBs ($Zn_3Mn$) kept very stable even after 120 h (5 days) without any degradation (red line), confirming the stability of Zn—Mn alloy in the seawater-based aqueous electrolyte.

Figure 31:
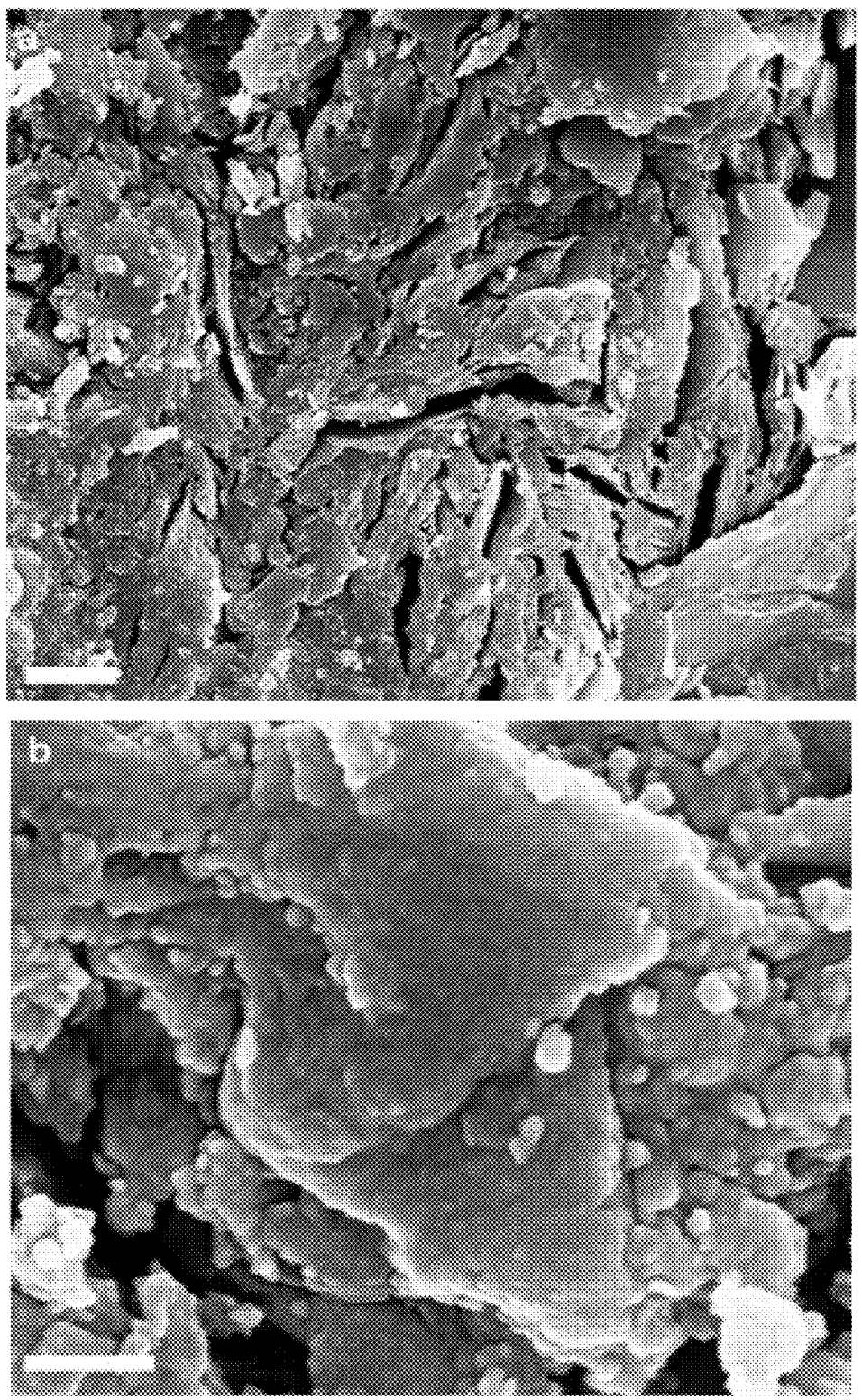

FIG. 31 is a pair of SEM images of the morphologies of Zn—Mn alloy after long-term cycling. (a) Low-magnification and (b) high-magnification SEM images of Zn—Mn alloy after 2000 cycles in the seawater-based electrolyte. Scale bars: 1 μm in (a) and 200 nm in (b).

Figure 32:
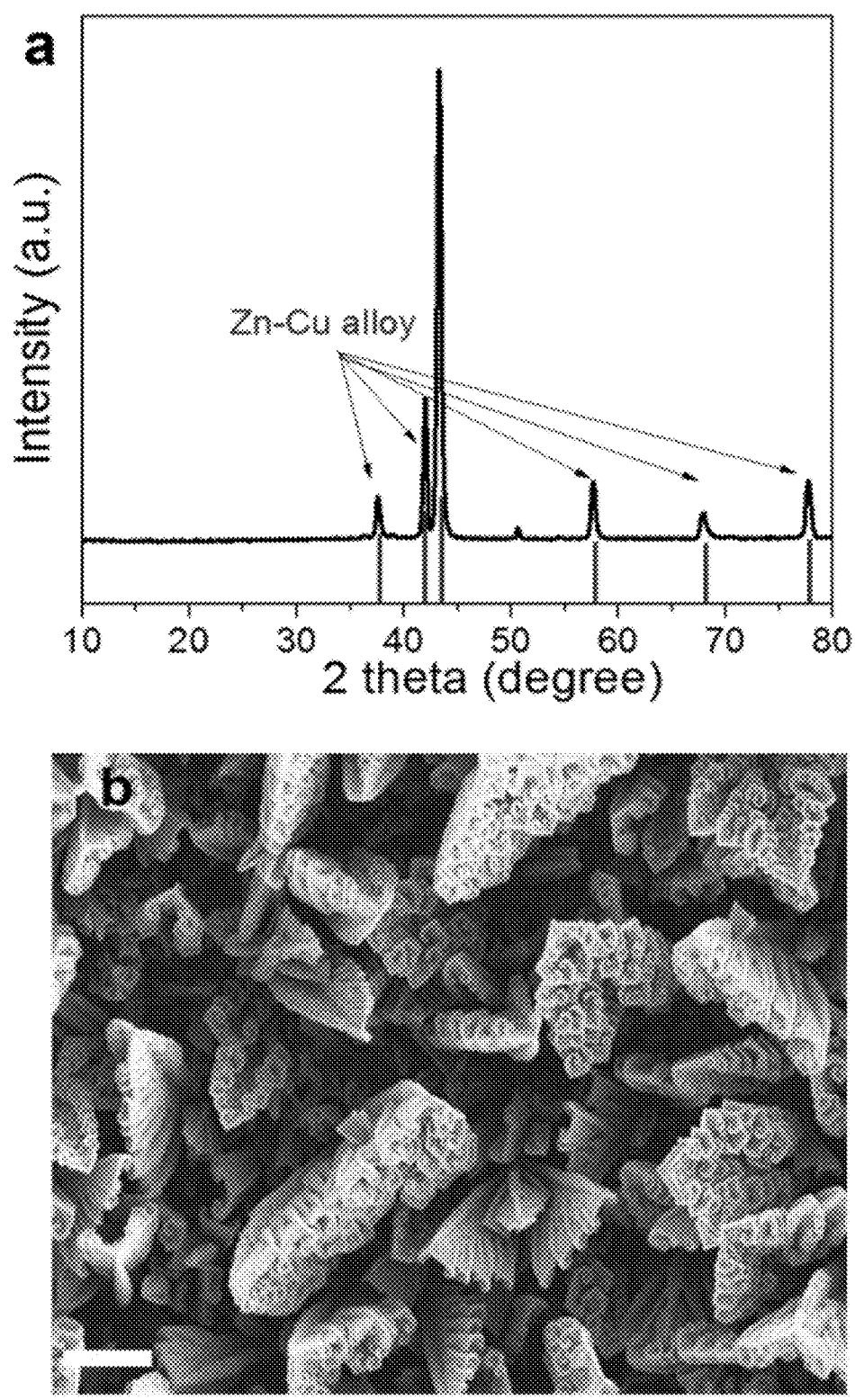

FIG. 32 is a graph and an SEM image of the structure and morphologies of Zn—Cu alloy, as follows: (a) XRD pattern and (b) SEM image of Zn—Cu alloy. XRD pattern confirmed the Zn—Cu alloy phase. SEM image showed the 3D structure.

DETAILED DESCRIPTION OF THE INVENTION

Figure 1:
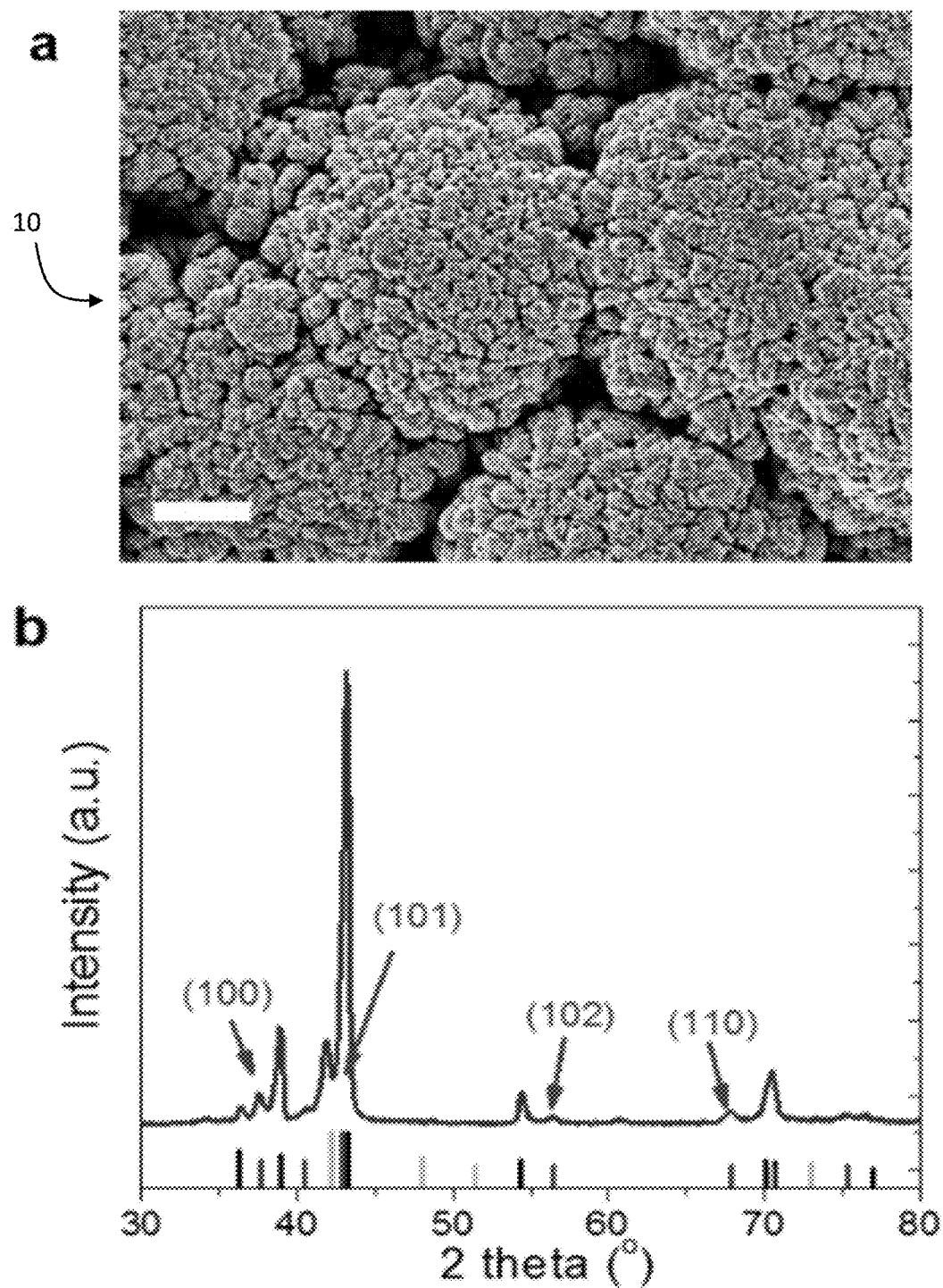
Figure 1:
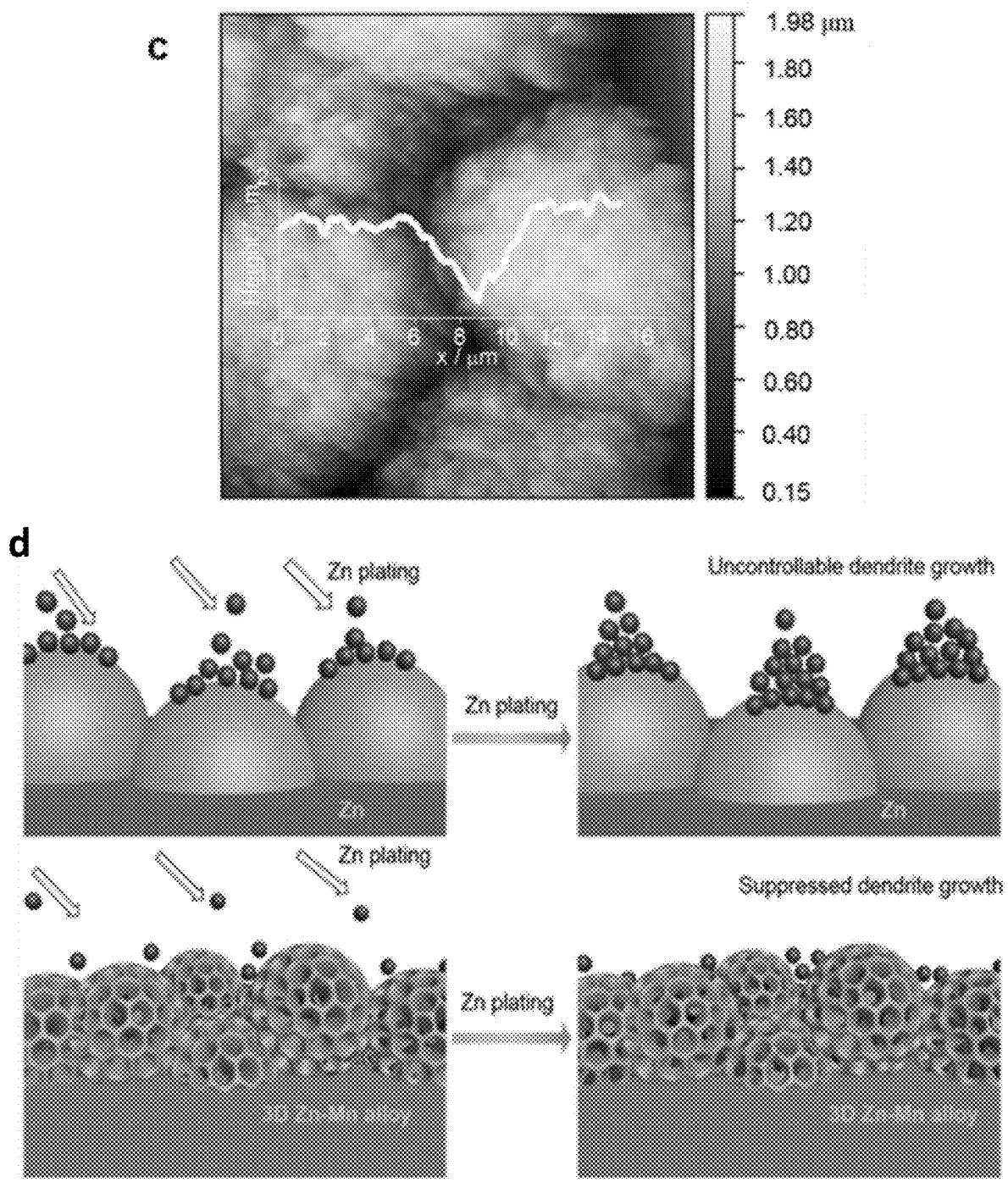

Referring to the figures, wherein like numeral refer to like parts throughout, there is seen in FIG. 1, a 3D structured Zn—Mn alloy 10 according to the present invention having a porous, three-dimensional nanostructure that resists dendrite formation and growth. The pores of the porous nanostructure have diameters between five nanometers and 50 micrometers. Alloy 10 may be prepared by co-electrodeposition of the ions, for example, $Zn^{2+}$ and $Mn^{2+}$, in a two-electrode electrochemical cell by a galvanostatic method to produce a three-dimensional structure as seen in panel g of FIG. 1. Dendrite growth was inhibited by the three-dimensional alloy 10 as illustrated in panel h of FIG. 1.

As an example, alloy 10 may be configured as an anode to resolve the interfacial instability issues and improve the electrochemical performance of aqueous batteries using low-cost seawater-based electrolytes. Different from the strategies using surface passivation layers to prevent dendrite growth in non-aqueous lithium electrochemical systems, the present invention efficiently minimizes and suppresses the dendrite formation in aqueous systems by controlling: 1) the surface reaction thermodynamics with the favorable diffusion channel of Zn on the $Zn_3Mn$ alloy, and 2) the reaction kinetics through the 3D nanostructures on the electrodes, at the same time. As a proof-of-concept, the proposed Zn—Mn alloy anodes were demonstrated to be ultra-stable during the Zn plating and stripping processes, leading to durable and dendrite-free electrodes for aqueous battery even under an extremely high current density of 80 mA $cm^{-2}$.

Preparation and Characterizations of Alloy Anode

An alloy electrodeposition approach was developed to prepare 3D structured Zn—Mn anodes according to the present invention. This method can be used as a universal strategy for synthesizing various alloy anodes by adjusting the composition of deposition solution, applied deposition current or voltage, and deposition time. The 3D alloy anode was validated by studying the electrochemical performance of Zn—Mn anode.

Compared with $Zn^{2+}$/Zn, the standard equilibrium potential of $Mn^{2+}$/Mn is much lower (see Table 1 below), enabling the Zn deposition on the surface of Zn—Mn alloy unfavorable for Zn dendrite formation due to the electrostatic shield effect. The potential extension of this strategy was demonstrating by showcasing another anode—Zn—Cu alloy. Other alloys beyond Zn—Mn and Zn—Cu are within the scope of the present invention, such as Zn—Ni, Zn—Co, Zn—Fe, Zn—Mg, etc., based on their high corrosion resistance among the typical Zn-based alloys.

TABLE 1

Reduction potentials of different metal ions in reduction half-reaction.

| Reduction half-reaction | Reduction potential |
| --- | --- |
| $Zn^{2+}$ (aq) + $2e^-$ → Zn (s) | −0.76 V |
| $Mn^{2+}$ (aq) + $2e^-$ → Mn (s) | −1.18 V |
| $Mg^{2+}$ (aq) + $2e^-$ → Mg (s) | −2.37 V |
| $Al^{3+}$ (aq) + $3e^-$ → Al (s) | −1.66 V |
| $Co^{2+}$ (aq) + $2e^-$ → Co (s) | −0.28 V |
| $Ni^{2+}$ (aq) + $2e^-$ → Ni (s) | −0.25 V |
| $Cu^{2+}$ (aq) + $2e^-$ → Cu (s) | +0.34 V |

Figure 4:
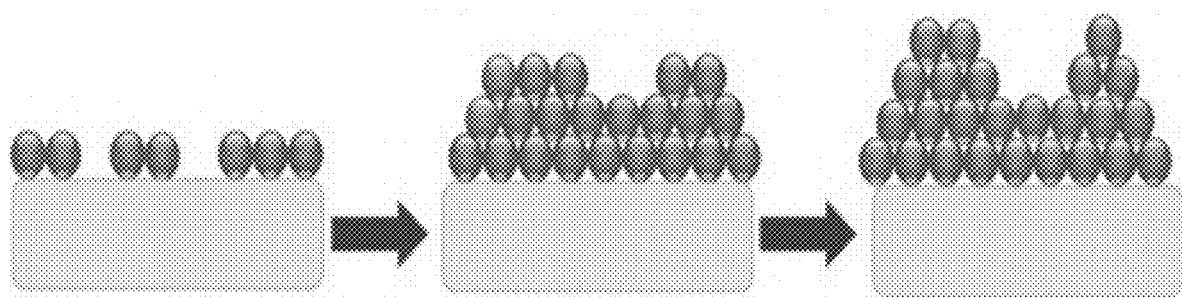
Figure 5:
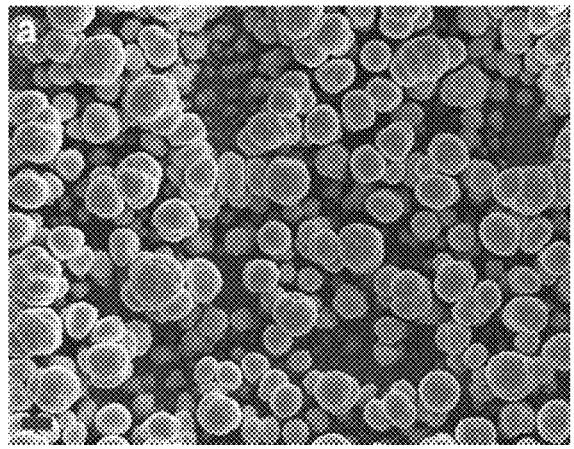
Figure 5:
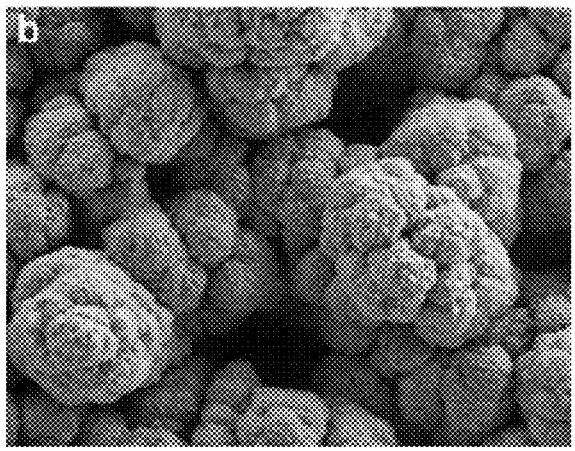
Figure 5:
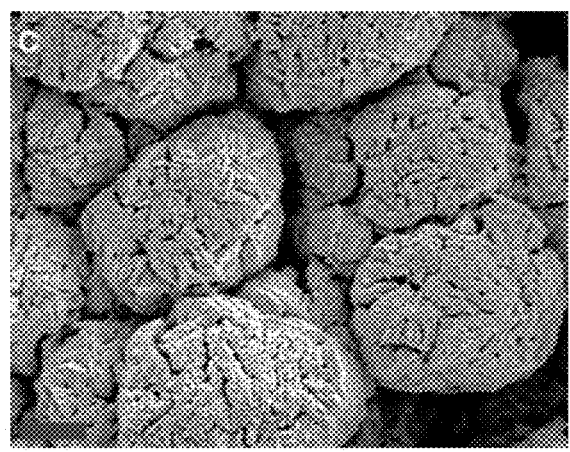
Figure 5:
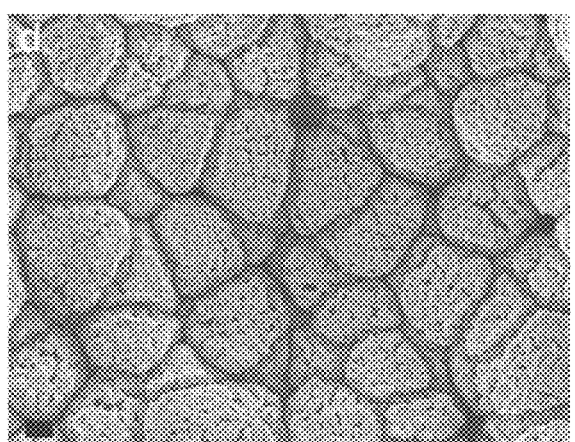
Figure 6:
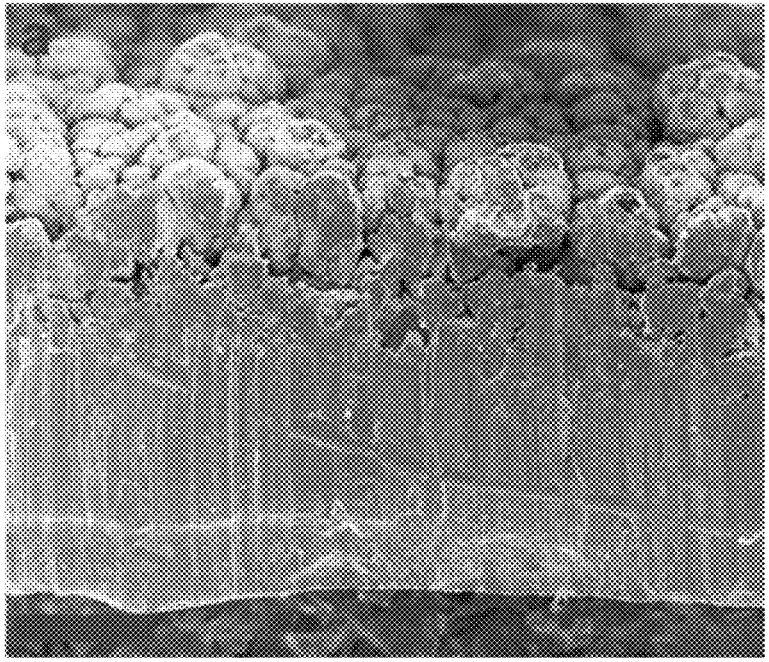
Figure 6:
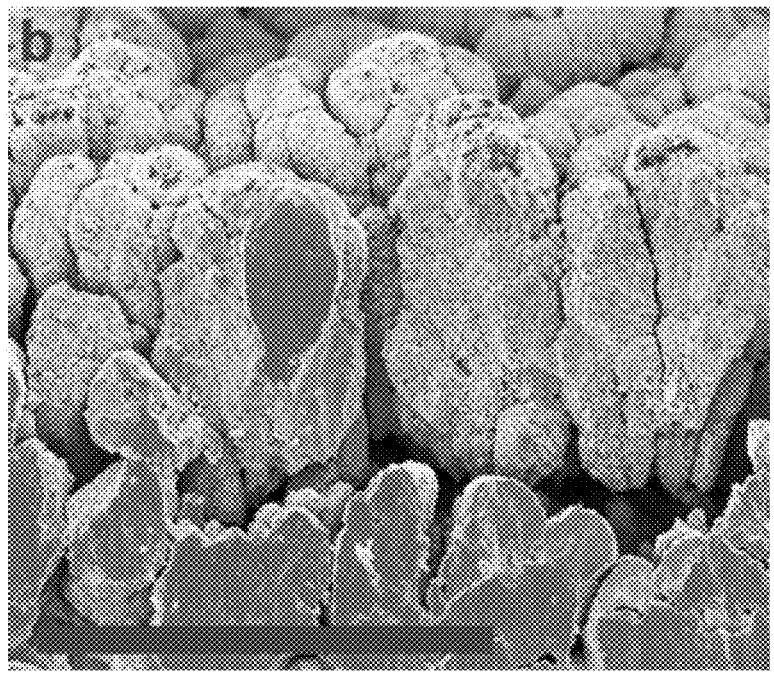
Figure 7:
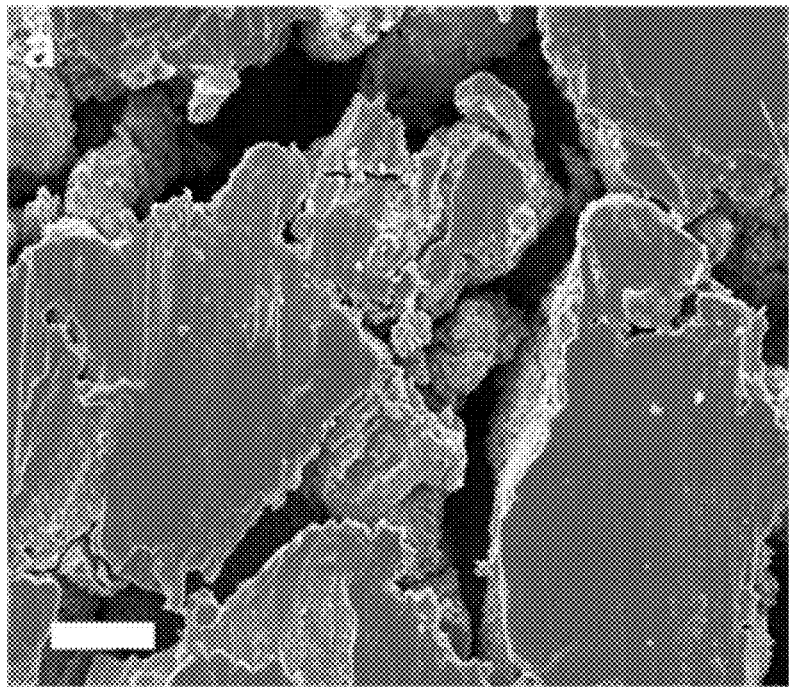
Figure 7:
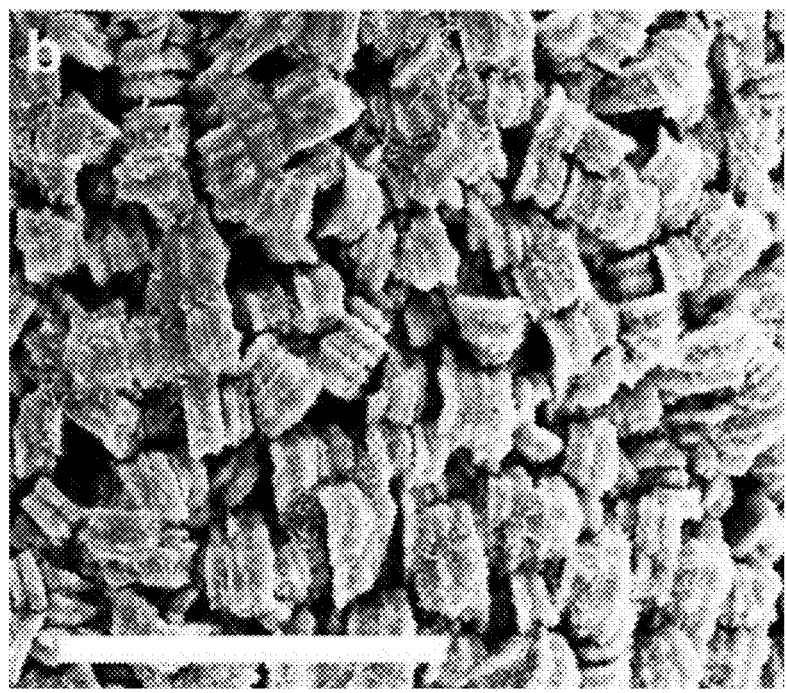

The electrodeposition of 3D Zn—Mn alloy was performed in a two-electrode electrochemical cell by a galvanostatic method. Continuous hydrogen ($H_2$) bubbles were observed during the alloy electrodeposition because of water dissociation incurred by the extremely high current density of 0.3 A $cm^{-2}$ used in this work. The electrodeposition time was varied from 10 min to 40 min and it was found that the evolved $H_2$ bubbles served as gaseous templates for the 3D structure formation following the Stranski-Krastanov mechanism (see FIG. 4). The morphologies of the Zn—Mn alloy changed from an isolated island-like structure to an interconnected 3D structure with a cauliflower-like surface (see FIG. 5). Based on the microscopic characterizations, the proposed alloy electrodeposition processes mainly include: (i) co-electrodeposition of various ions ($Zn^{2+}$ and $Mn^{2+}$);[31] (ii) $H_2$ bubbles evolution at the solid-liquid interface leading to the formation of the 3D structure (FIG. 1a and FIG. 6). Meanwhile, the hierarchical pores on the surfaces of the cauliflower-like 3D structures (FIG. 7) are beneficial for the facilitated mass transfer during charge/discharge cycling.

Figure 8:
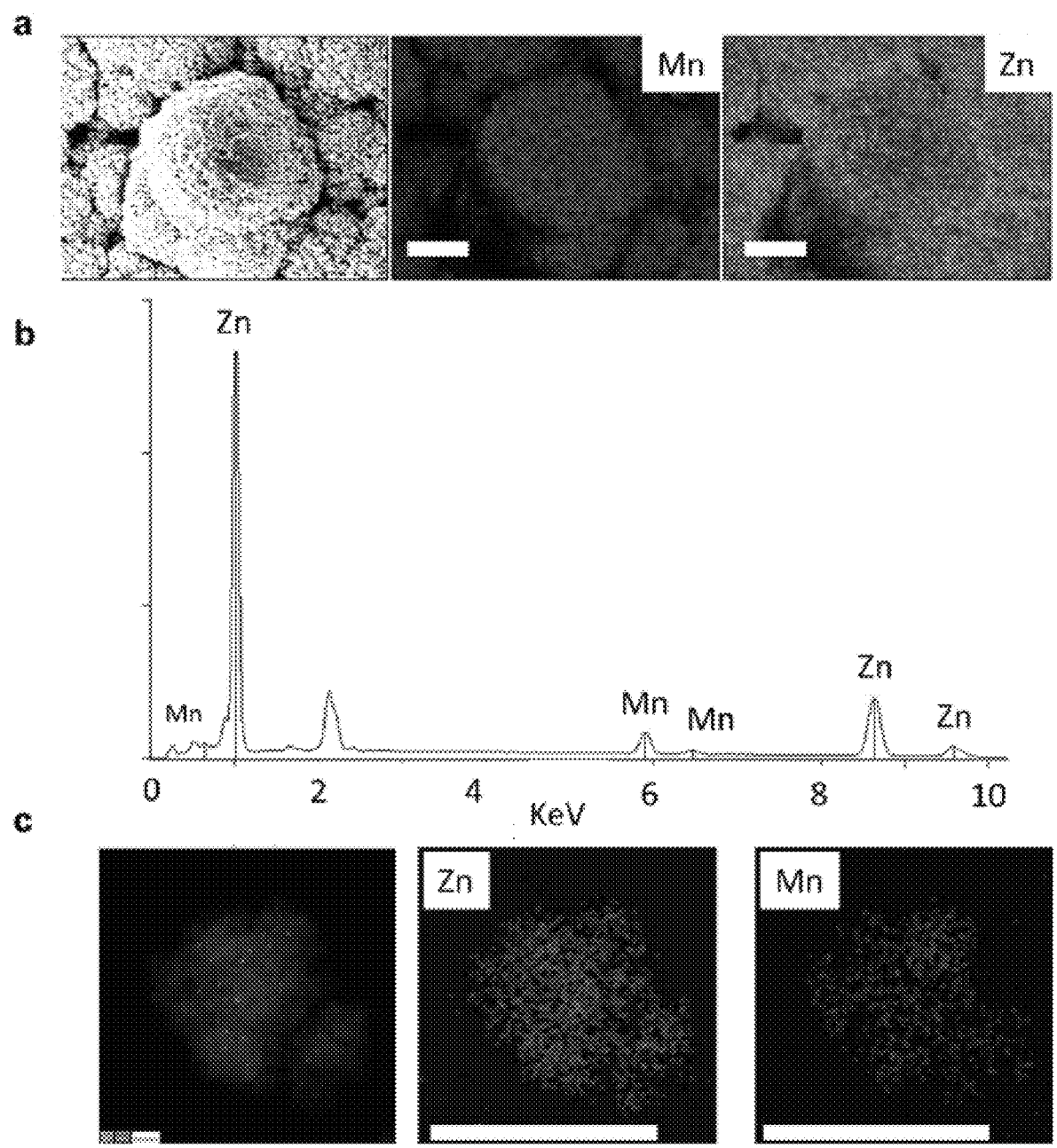
FIG. 8 is a series of graphs and images of the composition of the Zn—Mn alloy, as follows (a) SEM elemental mapping and (b) EDS spectra of Zn—Mn alloy prepared by 40 min deposition. Scale bars: 25 μm in (a).
Figure 9:
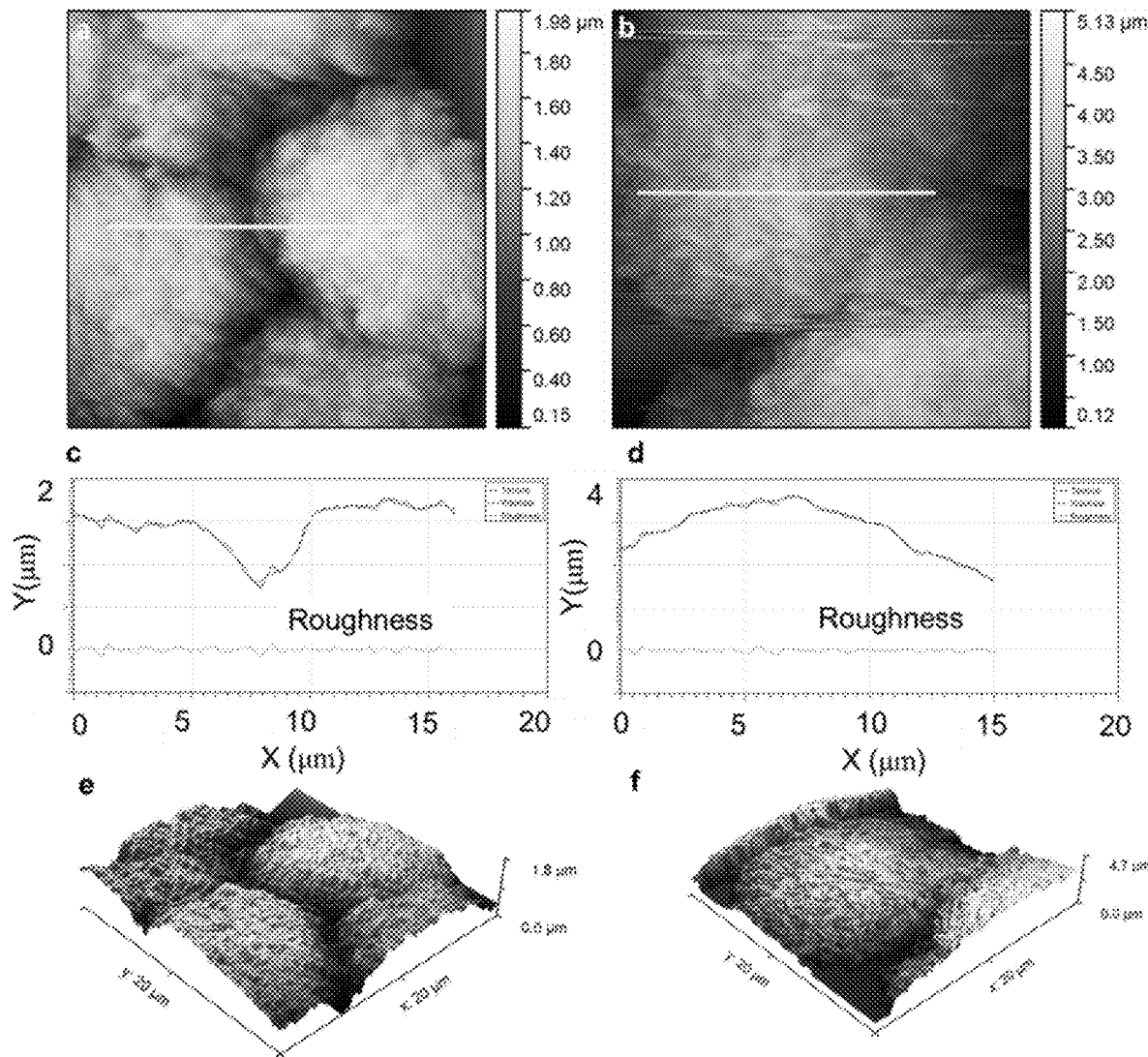
FIG. 9 is a series of graphs of the AFM topographies of Zn—Mn alloy, as follows: (a) Before and (b) after Zn plating at a current density of 0.5 mA cm$^{-2}$ (Areal capacity: 5.0 mAh cm$^{-2}$). The corresponding line profiles were plotted in (c) and (d), respectively. 3D AFM images of (e) before and (f) after Zn plating.
Figure 10:
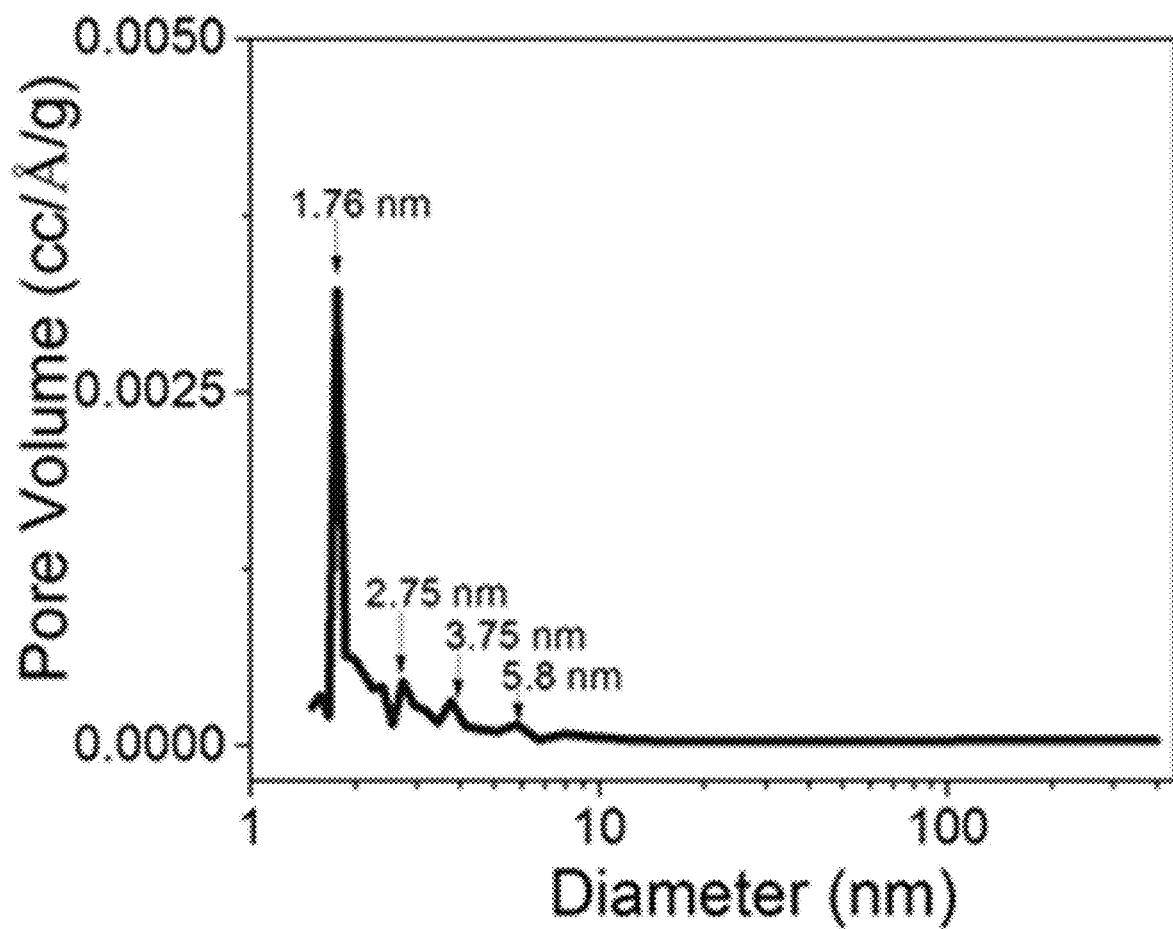
FIG. 10 is a graph of the Brunauer-Emmett-Teller (BET) pore size distributions of Zn—Mn alloy.

XRD pattern (FIG. 1b) and energy-dispersive X-ray spectroscopy (EDS, FIG. 8) elemental mapping confirm the formation of Zn—Mn alloy. The main peaks in the XRD pattern primarily correspond to the phase of P63/mmc(194)-hexagonal $Zn_3Mn$ (Note: in the following discussion Zn—Mn alloy and $Zn_3Mn$ denote the same material). The topography of the Zn—Mn alloy was observed with atomic force microscopy (AFM, FIG. 1c and FIG. 9) over a 20×20 μm area. The cauliflower-like 3D structures show a hierarchical roughness due to the co-existence of both micro- and nanoscale pores on the surface (FIG. 10). After Zn plating, the hierarchical roughness does not show a significant change with the root mean squared (RMS) of 25 nm and 32 nm calculated for the Zn—Mn anodes before and after Zn plating, respectively.

Figure 11:
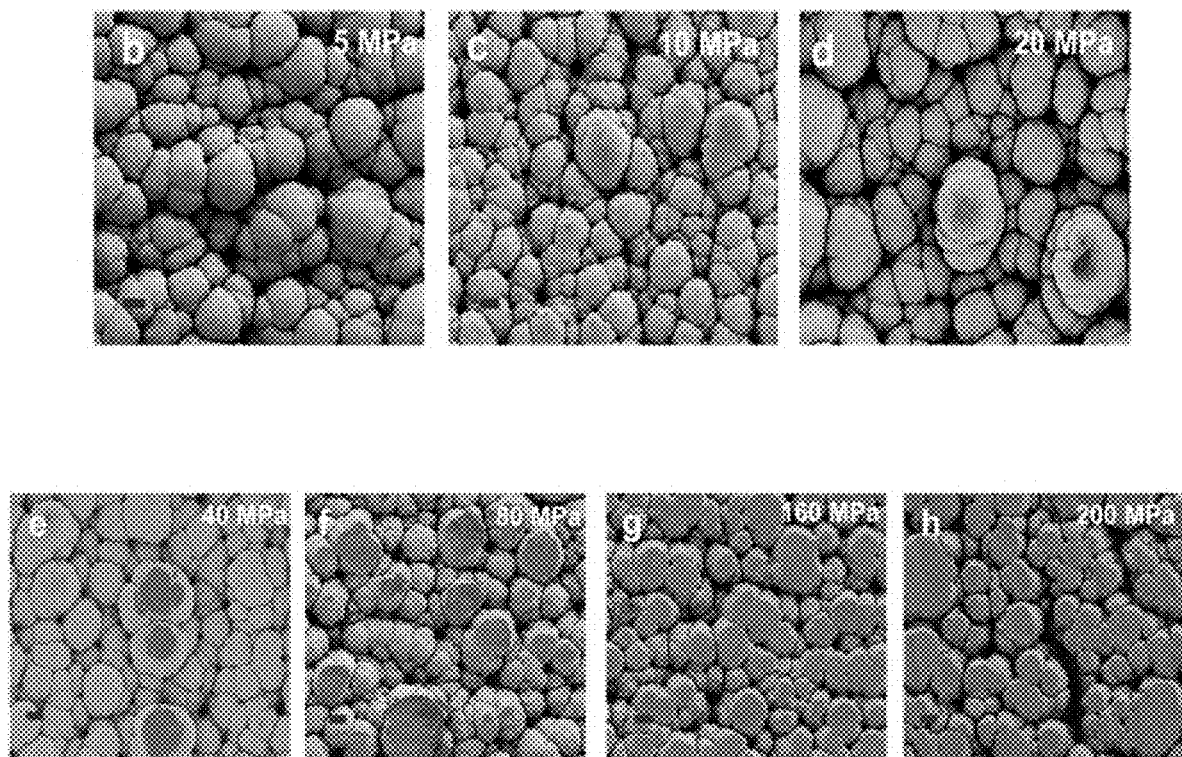
FIG. 11 is a series of images of the measurements of the Zn—Mn alloy after the calendering process, as follows (b-h) SEM images of the Zn—Mn alloy after a calendering process under a different pressure in a range from 5 to 200 MPa. Scale bars: 20 μm.
Figure 12:
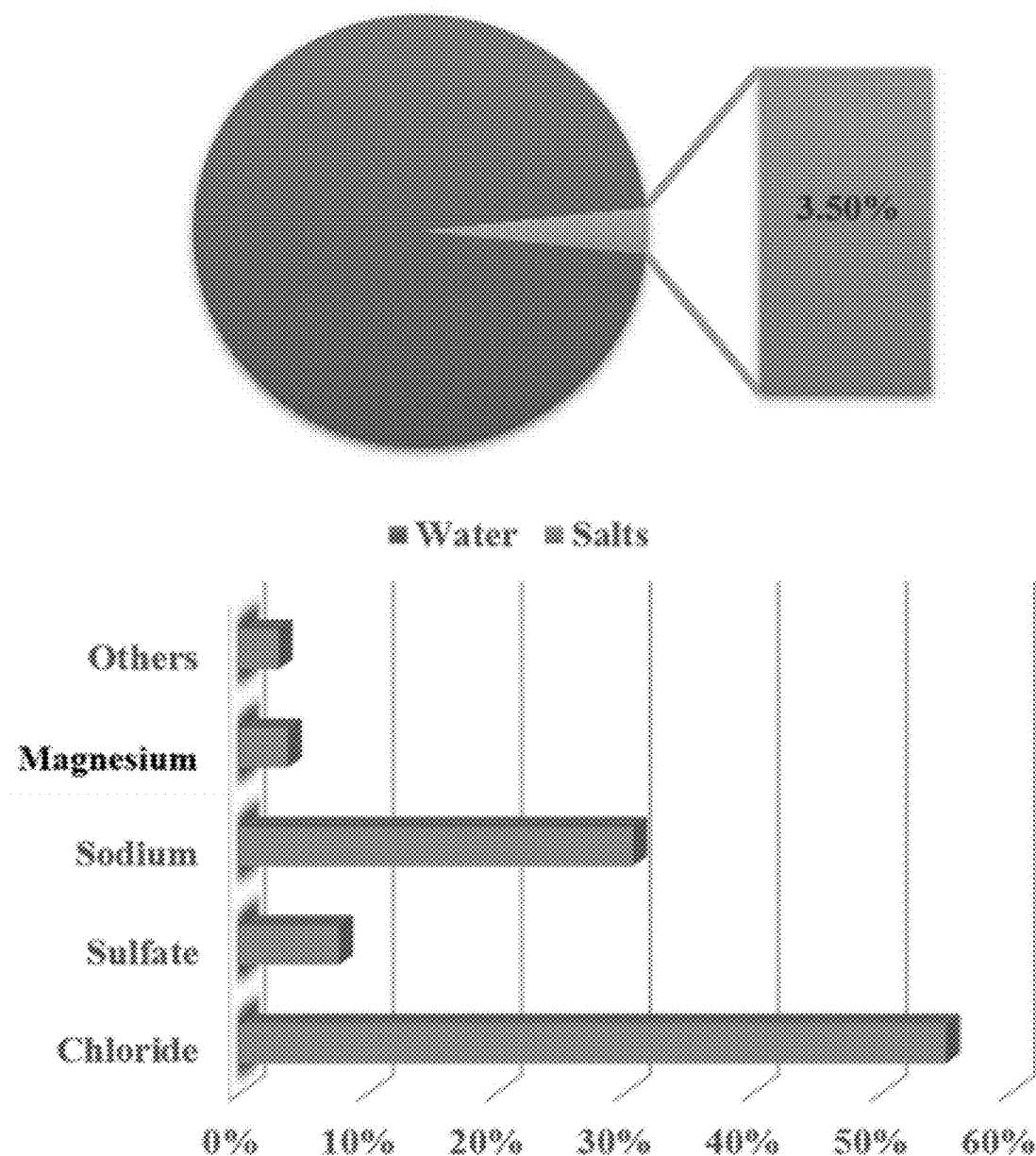
FIG. 12 is a graph of the seawater-based aqueous electrolytes showing the components of typical seawater, including 96.5% water and 3.5% salts. The seawater used in this work was only physically filtered to remove the suspended particles without any other treatment.

After the calendering process, the surface structure and morphology of the Zn—Mn alloy electrode remain barely changed even under high pressure of 80 MPa, indicating excellent mechanical stability (FIG. 11). Even under much higher pressures of 160 MPa and 200 MPa, only the top-surface structure of Zn—Mn alloy was squeezed. The basic shape of the 3D structured Zn—Mn alloy with a large number of voids and trenches remains stable, which provides free space for depositing Zn metal.

Alloy Anode Stability Under Harsh Electrochemical Environments

Traditional metal anodes used in aqueous batteries have poor stability under harsh conditions because of the accelerated corrosion, hetero-ions interference, and unexpected side-reactions. To further examine the electrochemical stability of $Zn_3Mn$ anode under harsh environments, seawater-based electrolytes consisting of complex compositions (3.5% saline water containing $Na^+$, $Mg^{2+}$, $Ca^{2+}$, $SO_4^-$, $Cl^-$, etc.) were adopted in this work. Another benefit of using seawater-based electrolyte is attributed to its earth abundance and almost free of charge (see Table 2 below), providing gigantic economic interest and competitiveness in the increasing energy storage markets.

Figure 2:
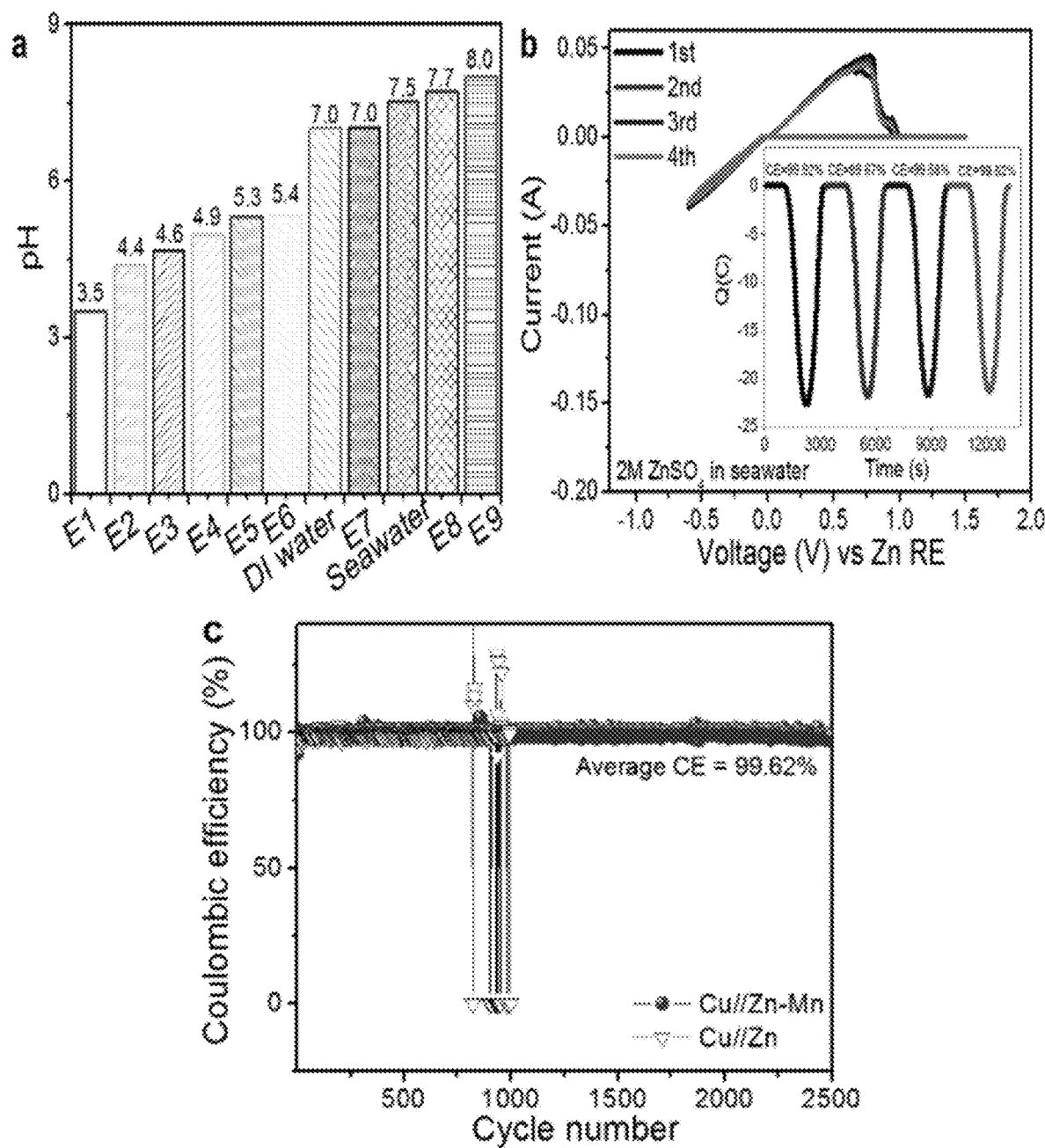
Figure 2:
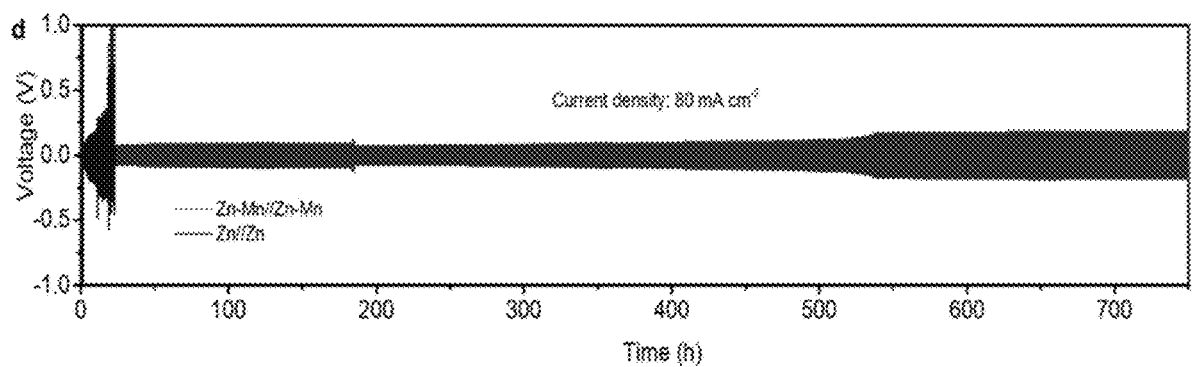

To systematically compare seawater-based electrolytes with conventional DI water-based electrolytes, nine kinds of aqueous electrolytes were prepared using DI water and seawater as solvents (FIG. 2a) for different metal salts ($ZnSO_4$, $MgSO_4$, $NaSO_4$, and $MnSO_4$). A three-electrode electrochemical cell with Pt was used as the working electrode and $Zn_3Mn$ alloy as the counter and reference electrodes to test the reversibility of Zn plating/stripping behaviors and electrochemical window in an electrolyte composed of 2 M $ZnSO_4$ in seawater (FIG. 2b). The chronocoulometry curves show that the Zn plating/stripping is highly reversible with a nearly 100% CE (initial CE: 99.92%). A stable and wide electrochemical window up to 2.6 V was achieved by using a $Zn_3Mn$ anode in the seawater-based electrolyte without any electrolyte decomposition (FIG. 13). The electrochemical stability window of aqueous electrolytes was explored by testing water dissociation potentials (FIG. 14a), e.g., hydrogen evolution reaction (HER) and oxygen evolution reaction (OER), in a three-electrode system. The seawater-based electrolyte (2M $ZnSO_4$ in seawater) has a wider electrochemical window increased from 2.4V to 2.6V as compared with DI water-based electrolyte (2M $ZnSO_4$ in DI water). When using seawater as a solvent, the content of free water molecules decreases, which has been proven to be an effective strategy to expand the electrochemical stability window. Moreover, the $Zn_3Mn$ electrode shows a significantly improved anti-corrosion ability in the seawater-based electrolyte as compared to the Zn electrode (FIG. 14b). On the contrary, a vigorous electrolyte decomposition and much narrower electrochemical windows were detected by using pristine Zn anode in both DI water-based and seawater-based electrolytes (FIG. 15). The CE of Zn plating/stripping processes was further evaluated via Cu//Zn (or Cu//Zn—Mn) cells using different aqueous electrolytes. A higher and more stable CE for Cu//Zn—Mn cells using different aqueous electrolytes was obtained (FIG. 16 and FIG. 17).

For the cycling performance of CE, the Zn—Mn alloy appears to have an average CE above 99.6% over 2500 cycles at a current density of 10 mA $cm^{-2}$ (FIG. 2c), demonstrating the long-term durability of $Zn_3Mn$ anode in the seawater-based electrolyte. Furthermore, electrochemical impedance spectra (EIS) of Zn//Zn and Zn—Mn//Zn—Mn symmetric cells were examined to understand the charge transfer kinetics in different electrolytes. In seawater-based electrolyte, a remarkably reduced charge transfer resistance of 1.5 ohms was achieved with a Zn—Mn//Zn—Mn symmetric cell (FIG. 18a), which was 75 times lower than that

TABLE 2

The cost comparison of the seawater and commercial solvents for aqueous batteries

| Solvent | Supplier | Pack Size | Price |
| --- | --- | --- | --- |
| Water (HPLC grade) | Fisher Scientific ™ | 1L | $70.00 |
| Water (HPLC grade) | Sigma-Aldrich | 1L | $52.00 |
| Water (HPLC grade) | Alfa Aesar | 1L | $36.70 |
| DI water | Sigma-Aldrich | 1L | $22.00 |
| DI water | Alfa Aesar | 1L | $26.4 |
| DI water | Fisher Scientific ™ | 1L | $21.90 |
| Seawater (in this work) | Florida's nearshore zone (near UCF) | Almost zero cost; directly used in this work after removing the suspended particles by an inexpensive filter paper | |

(Note: the prices may have variations depending on the market).

of Zn//Zn symmetric cell (115 ohms), indicating the facilitated reaction kinetics of Zn—Mn alloy. Similarly, the improved reaction kinetics was observed in the Zn—Mn alloy symmetric cells using DI water-based electrolytes (2 M $ZnSO_4$ in DI water, FIG. 18b) compared with pristine Zn. The nucleation and plateau overpotentials indicate the formation and growth thermodynamics of critical Zn atoms/clusters in the plating process. The nucleation and plateau overpotentials (27 mV and 19 mV, respectively) for the Zn—Mn alloy are much lower than those of pristine Zn anode (47 mV and 30 mV, respectively), further confirming the regulated Zn plating dynamics for Zn—Mn alloy anode (FIG. 18c). Moreover, the outstanding stability of Zn—Mn anode was further proved by galvanostatic cycling in the symmetric Zn—Mn//Zn—Mn cell under an extremely high current density of 80 mA $cm^{-2}$, showing ultra-stable plating/stripping behaviors for over 1900 cycles. Whereas, the short-circuit of the symmetric Zn//Zn cell was observed only after 80 cycles within less than 30 h (FIG. 2d and FIG. 19). The achieved great improvements in the electrochemical stability of metal anode under harsh environments validate our concept of using a Zn—Mn alloy for durable aqueous batteries. To further confirm the significance of $Zn_3Mn$ in the stabilized electrochemical performance, a 3D Zn@Zn anode (Zn foil coated with 3D Zn particles, FIG. 20) was prepared and used as a control sample for electrochemical tests. The Zn plating/stripping profiles and cycling performance of symmetric 3D Zn@Zn cell (FIG. 21) exhibit a large overpotential and failure caused by the dendrite growth and the corresponding internal short-circuit within less than 100 cycles at a low current density of 5 mA $cm^{-2}$ and less than 250 h at a high current density of 80 mA $cm^{-2}$. Ex-situ SEM observations (FIG. 22) were performed to diagnose the Zn plating processes under different current densities from 1 mA $cm^{-2}$ to 80 mA $cm^{-2}$. The dendrites were observed from the surface of pristine Zn anode, while a smooth surface without dendrite growth was achieved on the 3D Zn—Mn alloy anode even under harsh conditions such as high current densities up to 80 mA $cm^{-2}$.

Electrochemical Performance of Zn—Mn Anode in Aqueous Zn Batteries

Figure 3:
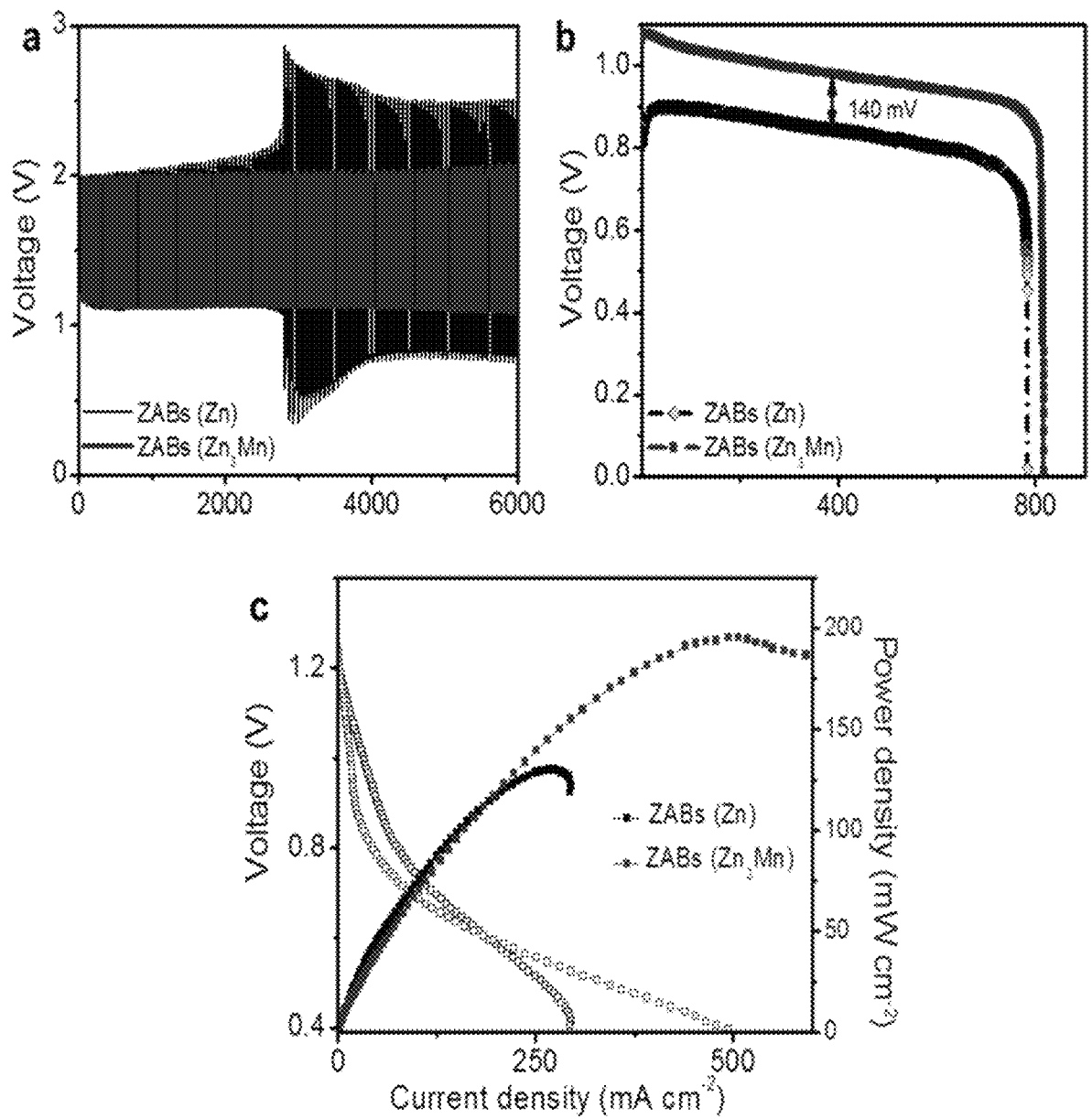
Figure 3:
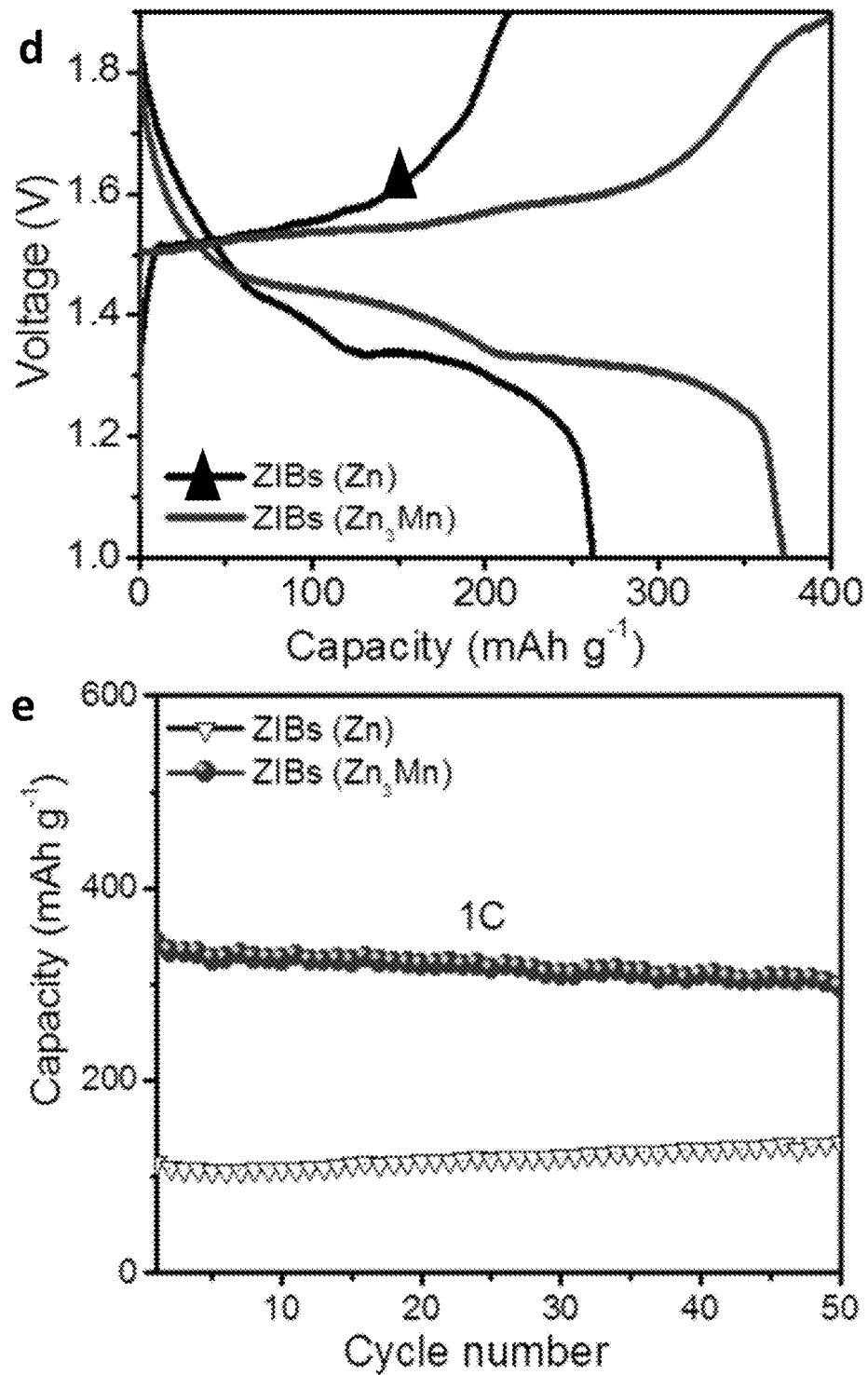
Figure 3:
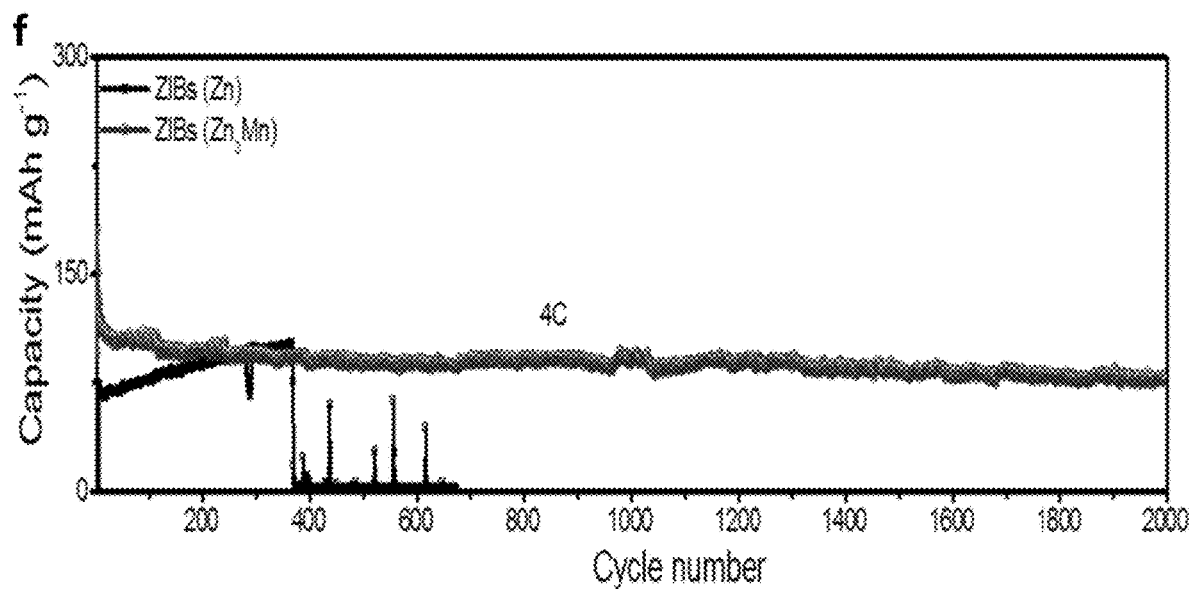

To demonstrate the practical performance of the Zn—Mn anode in aqueous batteries, ZABs were assembled using commercial Pt/C@RuO2 as the cathode and Zn—Mn alloy as the anode (FIG. 23). A control battery was assembled using the pristine Zn as the anode for a comparison. The ZABs using Zn—Mn anodes showed excellent charge/discharge cycling stability for over 6000 min test without degradation at a current density of 10 mA $cm^{-2}$. In contrast, the ZABs using Zn anodes failed quickly after 2760 min test with a huge hysteresis (FIG. 3a). The galvanostatic discharge capacities of ZABs using different anodes were recorded (FIG. 3b). Note that ZABs ($Zn_3Mn$) and ZABs (Zn) are used to represent the batteries using $Zn_3Mn$ and Zn anodes, respectively. At a high current density of 30 mA $cm^{-2}$, the ZABs ($Zn_3Mn$) delivered an extremely high discharge capacity of 816.3 mAh $gZn^{-1}$ corresponding to an energy density of 798.3 Wh $kgZn^{-1}$, higher than those of ZABs (Zn) (784 mAh $gZn^{-1}$ and 657 Wh $kgZn^{-1}$) and superior to the recent benchmarking ZABs. The significantly improved performance of the ZABs ($Zn_3Mn$) is ascribed to the sufficiently exposed active areas in the hierarchically porous 3D architectures via this surface/interface engineering. To further demonstrate the outstanding ZABs ($Zn_3Mn$) performance, recently developed materials composed of the co-incorporated platinum (Pt) and fluorine (F) were used in the PtCo nanosheets as a cathode to replace commercial Pt/C@RuO2.54.

As a proof-of-concept, a high peak power density of 196 mW $cm^{-2}$ (FIG. 3c) was achieved by ZABs ($Zn_3Mn$), which was much higher than that of ZABs (Zn) (130 mW $cm^{-2}$). Besides, the Zn—Mn alloy is also mechanically robust and can be used for flexible ZABs. The flexible ZABs ($Zn_3Mn$) in tandem cells exhibited nearly doubled voltages under different current densities. At the same time, the voltages of tandem ZABs ($Zn_3Mn$) at high current densities were quite stable, confirming the outstanding performance for the Zn—Mn anode (FIG. 24). Moreover, ZIBs full cells using $MnO_2$ cathodes, Zn—Mn alloy anodes, and seawater-based electrolyte (2 M $ZnSO_4$ and 0.1 M $MnSO_4$ in seawater) were evaluated for the electrochemical performance of Zn—Mn anode for aqueous ZIBs. The addition of $Mn^{2+}$ in the electrolytes would improve the reversibility, greatly enhance the utilization of $MnO_2$ active material, and suppress the dissolution of $MnO_2$ in aqueous Zn//$MnO_2$ batteries.[2, 55] The ZIBs ($Zn_3Mn$) using seawater-based electrolytes presented a higher capacity (373.2 mAh $g^{-1}$, FIG. 3e) at 0.5 C and higher discharge voltage plateaus than that of ZIBs (Zn) (262.5 mAh $g^{-1}$), confirming a more efficient charge transfer dynamics based on the Zn—Mn anode.

The anti-interference property of Zn—Mn anode against hetero-ions such as $Na^+$ and $Mg^{2+}$ in the seawater-based electrolyte was also investigated. As a control experiment, the ZIBs ($Zn_3Mn$) using Na+—containing electrolyte (2 M $Na_2SO_4$ in seawater) showed a noticeable capacity of 30 mAh $g^{-1}$, indicating a considerable storage capability in the ZIBs ($Zn_3Mn$) (FIG. 26). Besides, a $Mg^{2+}$-containing electrolyte (2 M $MgSO_4$ in seawater) was used to test the $Mg^{2+}$ anti-interference property in the ZIBs ($Zn_3Mn$). A distinct intercalation behavior was observed in the ZIBs ($Zn_3Mn$) with a high initial capacity of 110 mAh $g^{-1}$ (FIG. 27 and FIG. 28a, b) compared with the pristine Zn anode (FIG. 29). The impact of hetero-ions ($Na^+$ and $Mg^{2+}$) on the electrochemical performance of Zn—Mn alloy in the symmetric Zn—Mn//Zn—Mn cells was also investigated (FIG. 28c, d). And the anti-interference property of Zn—Mn anode against the other hetero-ions, including $Ca^{2+}$ and $Cl^-$, has also been investigated, confirming the insignificant effect of hetero-ions (e.g., $Ca^{2+}$ and $Cl^-$) on the electrochemical performance of Zn—Mn alloy. The results also confirmed the highly anti-interference behaviors of the Zn—Mn anode. Furthermore, the ZIBs ($Zn_3Mn$) using seawater-based electrolyte exhibited a stable capacity of 300 mAh $g^{-1}$ at 1 C, whereas the ZIBs (Zn) delivered a much lower capacity of 130 mAh $g^{-1}$ (FIG. 3f), demonstrating the superior electrochemical performance of ZIBs based on Zn—Mn anode in the seawater-based electrolyte. Furthermore, at a high rate of 4 C (FIG. 3g), the ZIBs (Zn) failed quickly after 368 cycles due to dendrite growth and short-circuit. In sharp contrast, the ZIBs ($Zn_3Mn$) could keep a very stable performance over 2000 cycles without any dendrite growth and short-circuit (FIG. 32), suggesting unprecedented stability under harsh conditions far surpassing those of other benchmarking Zn anodes (Table 3 below).

TABLE 3

Electrochemical performance of state-of-the-art Zn metal-based anodes for aqueous Zn batteries.

| Anode | Electrolyte | $J_{max}$ (mA cm$^{-2}$) | Stability |
|---|---|---|---|
| 3D Zn—Mn alloy | 2M ZnSO$_4$ in Seawater | 80 | 1900 cycles, 760 h |
| Tin (Sn)-modified 3D carbon felt@Zn | 2M ZnBr2, 3M KCl, and 0.8M N-methylethylpyrrolidinium bromide in DI water | 40 | 290 h |
| 3D Zn sponge | 6M KOH in DI water | 24 | 80 h |
| Zn foam | 1M ZnSO$_4$ + 1M MnSO$_4$ with 0.1M H$_2$SO$_4$ in DI water | 20 | 100 h |
| Polyamide coated Zn | 2M ZnSO$_4$ in DI water | 10 | 150 h |
| Zn/rGO | 1M ZnSO$_4$ in DI water | 5 | 80 h |
| Zn powder-coated on Al foil | 1m Zn(TFSI)$_2$ + 20m LiTFSI in DI water | 0.2 | 170 h |
| Zn foil | Water@ZnMOF808 (WZM) solid electrolyte | 0.1 | 360 h |
| Zn/CNT | 2M ZnSO$_4$ in DI water | 5 | 110 h |
| Zn/SS mesh | 3M Zn(CF$_3$SO$_3$)$_2$ in DI water | 2 | 300 h |
| Zn@ZIF-8 | 2M ZnSO$_4$ in DI water | 1 | 50 h |
| Zn@porous kaolin | 2M ZnSO$_4$ + 0.1M MnSO$_4$ in DI water | 4.4 | 800 h |
| Zn plate@TiO$_2$ | 3M Zn(CF$_3$SO$_3$)$_2$ in DI water | 1 | 150 h |
| Zn@HsGDY | 2M ZnSO$_4$ in DI water | 2 | 2400 h |
| Zn@PVB polymer | 1M ZnSO$_4$ in DI water | 0.5 | 2200 h |
| Zn@porous nano-CaCO$_3$ | 3M Zn(CF$_3$SO$_3$)$_2$ + 0.1M MnSO$_4$ in DI water | 0.25 | 836 h |
| Zn@carbon fibers(CFs) | 2M ZnSO$_4$ + 0.1M MnSO$_4$ in DI water | 1 | 160 h |
| Porous copper skeleton supported Zn | 2M ZnSO$_4$ in DI water | 0.5 | 350 h |
| Ti$_3$C$_2$T$_x$ MXene@Zn paper | 2M ZnSO$_4$ in DI water | 1 | 300 h |
| Cu foam@Zn | 2M ZnSO$_4$ + 0.1M MnSO$_4$ in DI water | 2 | 150 h |
| Zr coated Zn | 2M ZnSO$_4$ in DI water | 5 | 2100 h |
| Zn/PAN | 2M ZnSO$_4$ in DI water | 0.5 | 350 h |
| CNTs coated Zn | 2M ZnSO$_4$ + 1M MnSO$_4$ in DI water | 0.5 | 400 h |
| Zinc-plated copper mesh | 1M ZnSO$_4$ + 0.5M Na$_2$SO$_4$ + 1 g L$^{-1}$ Polyacrylamide (PAM) in DI water | 0.2 | 350 h |
| Active carbon coated zinc foil | 8M NaClO$_4$ + 0.4M Zn(CF$_3$SO$_3$)$_2$ in DI water | 1 | 100 h |
| Carbon fiber-graphite felt | 0.5M ZnSO$_4$ + 0.5M Na$_2$SO$_4$ in DI water | 1 | 700 h |
| Eutectic Zn$_{88}$Al$_{12}$ | 2M ZnSO$_4$ + 0.2M MnSO$_4$ in DI water | 0.5 | 400 h |
| Zn/Reduced graphene oxide | 0.5M ZnSO$_4$ in DI water | 1 | 300 h |
| Copper foam@Zn | 2M ZnSO$_4$ + 0.1M MnSO$_4$ in DI water | 2 | 300 h |
| Mesoporous hollow carbon spheres coated Zn foil | 2M ZnSO$_4$ in DI water | 1 | 500 cycles |
| MOF-PVDF coated Zn foil | 3M ZnSO$_4$ + 0.1M MnSO$_4$ in DI water | 3 | 100 h |
| 3D Zn array | 2M ZnSO$_4$ with 4% fumed silica in DI water | 1 | 280 cycles |
| Zinc foil | Zn(TFSI)$_2$/acetamide eutectic solution, m/m = 1:4 and 1:9 | 1 | 100 h |
| Zinc foil | LiTFSI + Zn(TFSI)$_2$ + urea in DI water | 0.02 | 400 h |
| Zinc foil | 3M Zn(CF$_3$SO$_3$)$_2$ + diethyl ether (2 vol. %) in DI water | 0.2 | 250 h |
| Zinc foil | 30m ZnCl$_2$ in DI water | 0.2 | 600 h |
| Zinc foil | Zn(ClO$_4$)$_2$ in DI water | 2 | 1100 h |
| Zinc foil | Gelatin powder + 1M ZnSO$_4$ + 0.1M MnSO$_4$ in DI water | 5 | 400 h |
| Zinc foil | ZnSO$_4$ + MnSO$_4$ + FS + FMEE (1M + 0.01M) in DI water | 0.2 | 1500 h |
| Zinc foil | 0.5M Zn(CF$_3$SO$_3$)$_2$ in (TEP-H$_2$O) | 0.25 | 1000 h |
| Zinc foil | 3M ZnSO$_4$ in DI water | 0.1 | 50 h |
| Zinc foil | 3M ZnSO$_4$ + 0.1M MnSO$_4$ in DI water | 0.1 | 180 h |

The slow activation of the Zn/MnO$_2$ batteries as shown in FIG. 3g could be caused by: (i) the diffusing paths of Zn$^{2+}$ ion are gradually constructed due to the continuous infiltration of electrolytes after cycling; (ii) during the electrode activation process, more reactive sites could be exposed and the ionically conductive network of Zn$^{2+}$ ion is greatly improved at the electrolyte/electrode interface. To further demonstrate the broader impacts of the proposed concept in the battery field, a 3D Zn—Cu alloy (FIG. 32) according to the present invention was electrodeposited, which could be another material for high-performance aqueous batteries. Note that the 3D Zn—Cu anode is identified here as a potential extension of the proposed strategy for anode stabilization.

The present invention thus provides a universal strategy for designing 3D Zn—Mn alloys for use as anodes, with a potential extension to other alloy-based anode materials for stable, high-performance, dendrite-free, seawater-based aqueous batteries. The 3D Zn—Mn alloy anode, even under harsh electrochemical environments (hetero-ions interference from the seawater-based electrolyte and high current density of 80 mA cm$^{-2}$), maintained controllable Zn plating/stripping with robust structural stability and absolute reversibility for aqueous batteries. As a proof-of-concept, the seawater-based aqueous ZIBs and ZABs using Zn—Mn alloy anodes delivered outstanding performance towards energy storage, which proved the novelty and significance of this work.

METHODS

Galvanostatic Alloy Electrodeposition of Zn—Mn Alloys

All three-dimensional (3D) structured Zn—Mn alloys were electrodeposited on Zn substrates (99.95% metals basis, 0.25 mm thick, Alfa Aesar™). 100 mL deionized (DI) water was pre-heated at 80° C. as the solvent to dissolve 0.2 M zinc sulfate heptahydrate ($ZnSO_4 \cdot 7H_2O$, Fisher Chemical), 0.2 M sodium citrate dihydrate (Granular/Certified), and 0.6 M ethylenediaminetetraacetic acid disodium salt dihydrate (Crystalline/Certified ACS, Fisher Chemical) under continuous stirring for 30 min (noted as Solution A). Then, 0.6 M manganese (II) sulfate monohydrate ($MnSO_4 \cdot H_2O$, 99+%, extra pure, ACROS Organics™) was added to Solution A and stirred for another 30 min until a transparent solution was obtained (noted as Solution B). The Zn—Mn alloys were then deposited on Zn substrates using a two-electrode setup with platinum mesh as the counter electrode at a current density of 0.3 A cm$^{-2}$ in Solution B.

Potentiostatic Alloy Electrodeposition of Zn—Cu Alloys 100 mL DI water was pre-heated as the solvent to dissolve zinc sulfate heptahydrate ($ZnSO_4 \cdot 7H_2O$, Fisher Chemical), copper (II) sulfate pentahydrate (Fisher Chemical), and boric acid (Powder/Certified ACS, Fisher Chemical) under continuous stirring for 20 min until a transparent solution was obtained (noted as Solution C). The Zn—Cu alloys were deposited on Zn substrates using the two-electrode setup in Solution C.

Zn@Zn Anode Fabrication

The Zn@Zn anode was electrodeposited in Solution A using the same conditions as those for the deposition of Zn—Mn alloy.

Seawater-Based Aqueous Electrolytes

Nine kinds of aqueous electrolytes were prepared: Electrolyte 1 (2 M $ZnSO_4$ and 0.1 M $MnSO_4$ in DI water); Electrolyte 2 (2 M $ZnSO_4$ in DI water); Electrolyte 3 (2 M $ZnSO_4$ and 0.1 M $MnSO_4$ in seawater); Electrolyte 4 (2 M $ZnSO_4$ in seawater); Electrolyte 5 (1 M $ZnSO_4$ and 1 M $MgSO_4$ in seawater); Electrolyte 6 (1 M $ZnSO_4$ and 1 M $MgSO_4$ in DI water); Electrolyte 7 (2 M $MgSO_4$ in seawater); Electrolyte 8 (2 M $Na_2SO_4$ in seawater); Electrolyte 9 (2 M $MgSO_4$ in DI water). The seawater was taken from Florida's nearshore zone, physically filtered to remove the suspended particles, and directly used in this work without any other treatment.

Cathode Preparation for Rechargeable Zn Aqueous Batteries $MnO_2$ cathode materials were prepared for Zn-ion batteries (ZIBs) full-cell testing by a hydrothermal method. Typically, 0.5 g $MnSO_4 \cdot H_2O$ and 2 mL 0.5 M $H_2SO_4$ were added to 100 mL DI water under continuous stirring until a clear solution (noted as Solution D) was obtained. After that, 25 mL 0.1 M $KMnO_4$ aqueous solution was slowly added to Solution D and stirred for 5 h. The as-prepared solution was transferred to a Teflon-lined PTFE autoclave vessel and heated at 120° C. for 8 h. Then, $MnO_2$ powder was collected, washed by DI water, and dried at 60° C. overnight in a vacuum oven. The ZIBs cathodes were prepared by a doctor-blade method. First, $MnO_2$ powder, polyvinylidene fluoride (PVDF) binder, and super P carbon were mixed in N-methyl pyrrolidinone (NMP) solvent in a weight ratio of 7:1:2 to get a homogenous slurry. Then, the obtained mixed slurry was coated onto carbon paper (CP) and dried at 80 oC overnight in the vacuum oven.

Pt/C@$RuO_2$ and F-doped PtCo nanosheets on the nickel foam (PtCoF@nickel foam) were prepared as cathodes for Zn-air batteries (ZABs) testing according to our prior work54. The Pt/C@$RuO_2$ cathode was prepared in the following procedure: 1) 3.2 mg Pt/C powder was mixed with 3.2 mg $RuO_2$ in the 3.2 ml Nafion/isopropanol solution (98:2, v/v), and then ultrasonicated for 20 min. The obtained suspension was disposed on 4×4 cm$^2$ carbon paper and dried at 60° C. The single-atom PtCoF@nickel foam was prepared by fluorine (F)-plasma treatment using carbon tetrafluoride as a source in a plasma etcher (Trion MiniLock II RIE-ICP) using the PtCo@nickel foam as a precursor.

Electrochemical Tests

Symmetric cells were assembled using Zn (or Zn—Mn alloy) foils as both cathode and anode, which were separated by a glass fiber membrane saturated with different aqueous electrolytes. For Cu//Zn (or Cu//Zn—Mn) cells, Cu and Zn (or Zn—Mn alloy) foils were used as cathode and anode, respectively, for the plating/stripping tests in the aqueous Zn batteries. The active areas of electrodes were 1 cm$^2$ (1 cm×1 cm) in coin cells. Cyclic voltammetry (CV) and electrochemical impedance spectroscopy (EIS) data were measured by CHI 600E electrochemical workstation. The electrochemical performance of aqueous electrolytes was tested in a three-electrode setup (Pt mesh as the working electrode, Zn (or Zn—Mn alloy) foil as both counter and reference electrodes) at a scan rate of 1 mV s$^{-1}$.

Zn (or Zn—Mn alloy) anodes and $MnO_2$@Carbon Paper ($MnO_2$@CP) cathodes were assembled in CR2032 coin cells for the ZIBs full-cell testing. The mass loading of $MnO_2$ was 2-3 mg cm$^{-2}$. Pt/C@$RuO_2$ (or PtCoF@nickel foam) cathodes and Zn (Zn—Mn alloy) anodes were assembled with an electrolyte consisting of 6 M KOH and 0.2 M zinc acetate for ZABs full-cell testing. Gel electrolytes were also prepared by mixing polyvinyl alcohol (PVA) powder with 6 M KOH and 0.2 M zinc acetate at 80° C. to assemble the flexible ZABs.

Materials Characterizations

X-ray diffraction patterns (XRD) were obtained on a film XRD system (Panalytical X'celerator multi-element detector with Cu Kα radiation source, λ=1.54056 Å). The surface topographies were characterized by atomic force microscopy (AFM, Veeco Dimension 3100) using tapping mode.

The morphologies of the materials were characterized by scanning electron microscopy (SEM, ZEISS ultra 55) with EDS mapping.

Growth Mechanism of 3D Zn—Mn Alloy by Electrodeposition

The Stranski-Krastanov growth mechanism (FIG. 4) was suggested to explain the formation of 3D Zn—Mn alloy through heterogeneous nucleation and growth processes. In detail, the electrodeposition process includes heterogeneous chemical reactions at the liquid-solid interface. In the initial stage, the nucleation and growth processes were accompanied by the diffusion of highly mobile clusters or islands of the deposits on the electrode surface. In the following stage, the nuclei coalesced to form a continuous film with 3D structures on the top (FIG. 5).

What is claimed:

1. A method of making an anode for an aqueous battery, comprising:
    co-electrodepositing ions of zinc and ions of a transition metal on a substrate; and
    simultaneously facilitating hydrogen bubble evolution at a solid/liquid interface of the substrate during the co-electrodeposition of the ions of zinc and the ions of the transition metal to form a coating on the substrate comprising a porous alloy of zinc and the transition metal forming an anode comprising the coated substrate, wherein the coating remains dendrite-free at current densities of up to 80 mA $cm^{-2}$ in an aqueous battery.

2. The method of claim 1, wherein the co-electrodepositing the ions of zinc and the ions of the transition metal occurs at a current density of 0.3 A $cm^{-2}$.

3. The method of claim 1, wherein the co-electrodepositing the ions of zinc and the ions of the transition metal is performed for a time period of between 10 and 40 minutes.

4. The method of claim 1, wherein the transition metal comprises manganese.

5. The method of claim 1, wherein the transition metal comprises copper.

6. The method of claim 1, wherein the alloy comprises $Zn_3Mn$.

7. A method of making an anode for an aqueous battery, comprising:
    co-electrodepositing ions of zinc and ions of a transition metal on a substrate; and
    simultaneously facilitating hydrogen bubble evolution at a solid/liquid interface of the substrate during the co-electrodeposition of the ions of zinc and the ions of the transition metal to form a coating on the substrate comprising a porous alloy of zinc and the transition metal forming an anode comprising the coated substrate, wherein the coating comprises a plurality of pores having a diameter between five nanometers and 50 micrometers or between 1 nanometer and 10 nanometers.

8. The method of claim 7, wherein the co-electrodepositing the ions of zinc and the ions of the transition metal occurs at a current density of 0.3 A $cm^{-2}$.

9. The method of claim 7, wherein the co-electrodepositing the ions of zinc and the ions of the transition metal is performed for a time period of between 10 and 40 minutes.

10. The method of claim 7, wherein the transition metal comprises manganese.

11. The method of claim 7, wherein the transition metal comprises copper.

12. The method of claim 7, wherein the alloy comprises $Zn_3Mn$.

13. A method of making an anode for an aqueous battery, comprising:
    co-electrodepositing ions of zinc and ions of either copper or manganese on a substrate; and
    simultaneously facilitating hydrogen bubble evolution at a solid/liquid interface of the substrate during the co-electrodeposition of the ions of zinc and the ions of either copper or manganese to form a coating on the substrate comprising a porous alloy of zinc and either copper or manganese forming an anode comprising the coated substrate.

14. The method of claim 13, wherein the co-electrodepositing the ions occurs at a current density of 0.3 A $cm^{-2}$.

15. The method of claim 13, wherein the co-electrodepositing the ions is performed for a time period of between 10 and 40 minutes.

16. The method of claim 13, wherein the coating comprises a plurality of pores having a diameter between five nanometers and 50 micrometers.

17. The method of claim 13, wherein the coating comprises a plurality of pores having a diameter between 1 nanometer and 10 nanometers.

18. The method of claim 13, wherein the coating comprises a plurality of pores having a diameter from 1.76 nanometers to 5.8 nanometers.

19. The method of claim 13, wherein the alloy comprises $Zn_3Mn$.

* * * * *